INVENTORS
HARRY F. OLSON AND
HERBERT BELAR
ATTORNEY

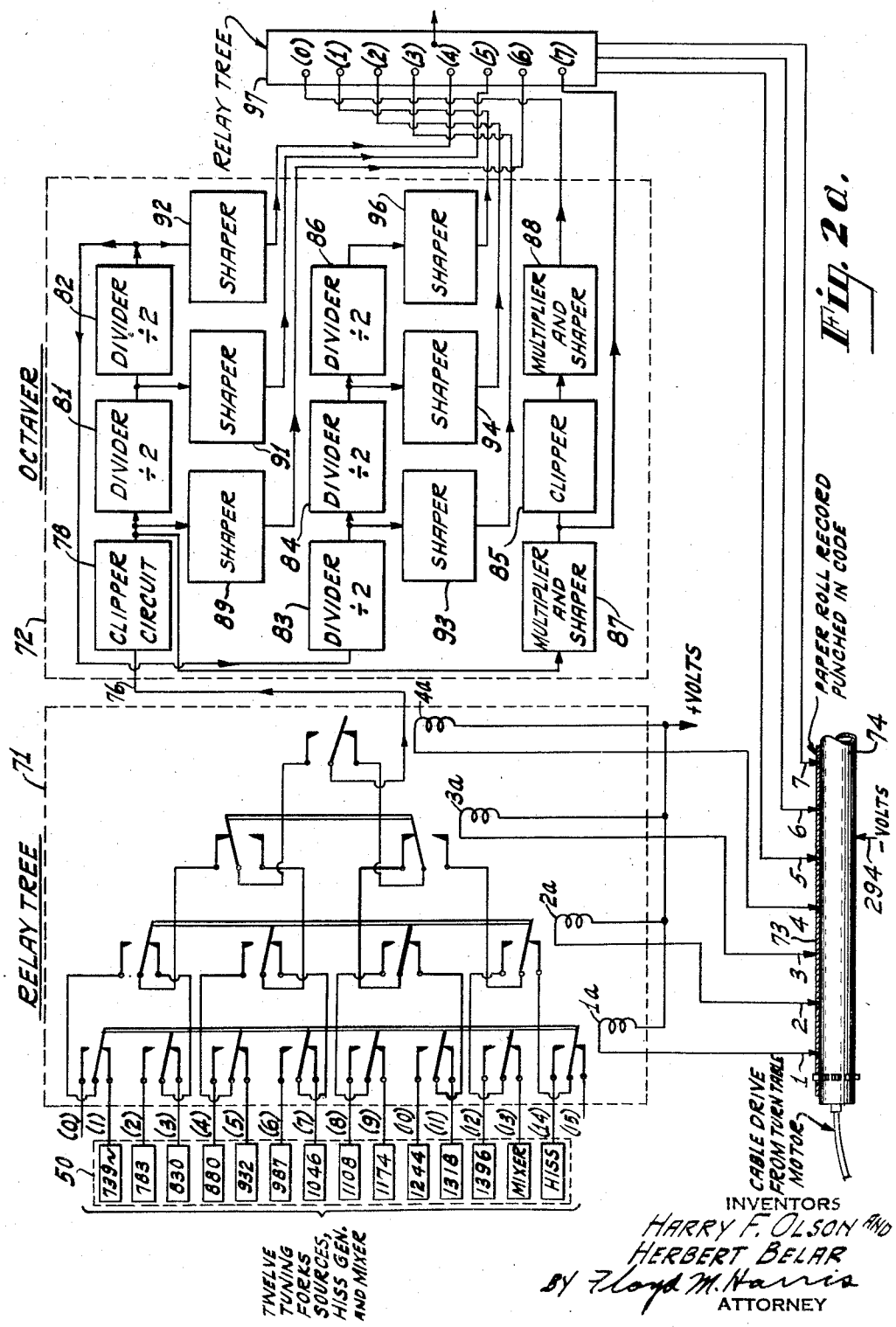

Oct. 14, 1958 H. F. OLSON ET AL 2,855,816
MUSIC SYNTHESIZER
Filed Dec. 26, 1951 19 Sheets-Sheet 3

INVENTORS
HARRY F. OLSON AND
HERBERT BELAR
BY Floyd M. Harris
ATTORNEY

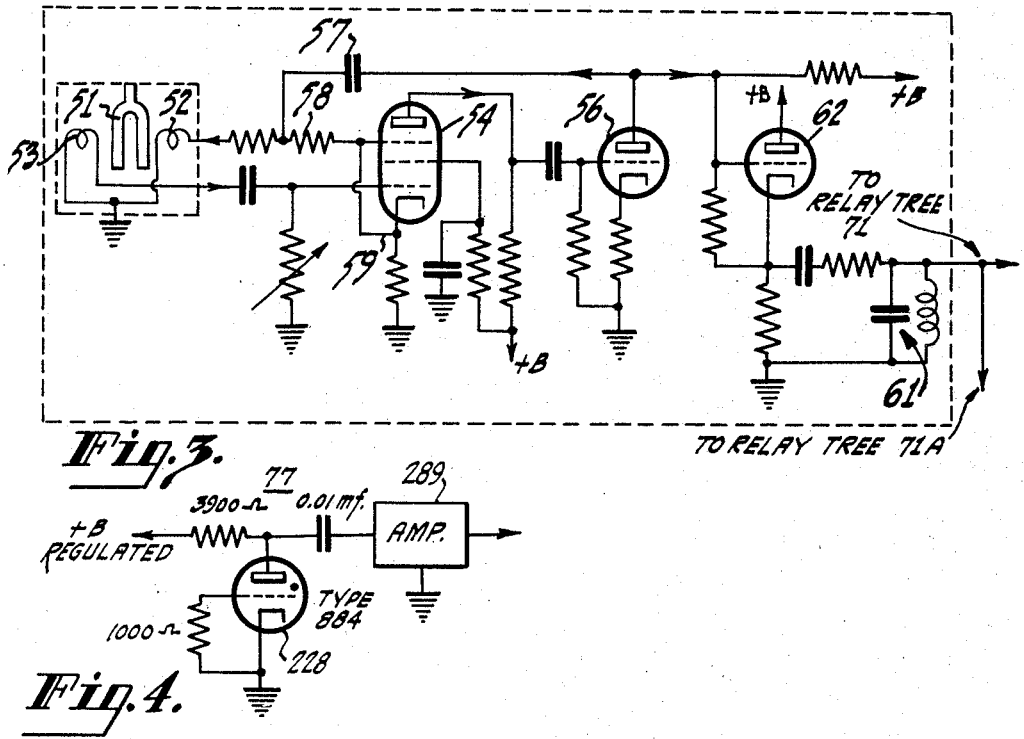
Fig. 3.
Fig. 4.
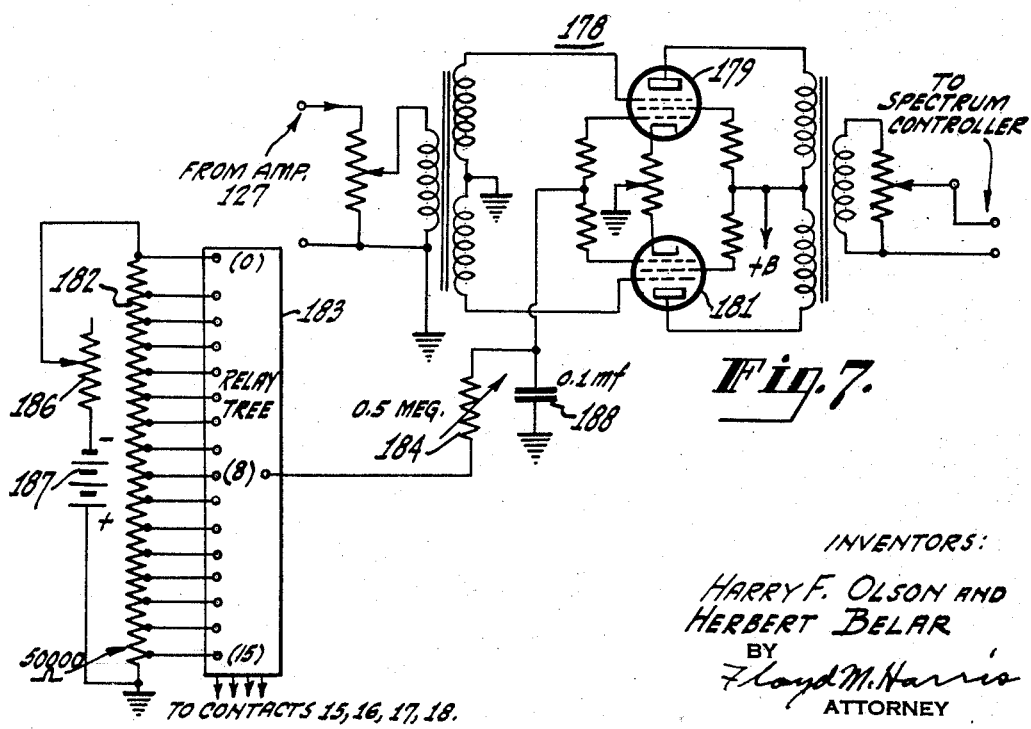
Fig. 7.
INVENTORS:
HARRY F. OLSON AND
HERBERT BELAR
BY
Floyd M. Harris
ATTORNEY Oct. 14, 1958     H. F. OLSON ET AL     2,855,816
MUSIC SYNTHESIZER
Filed Dec. 26, 1951     19 Sheets-Sheet 5
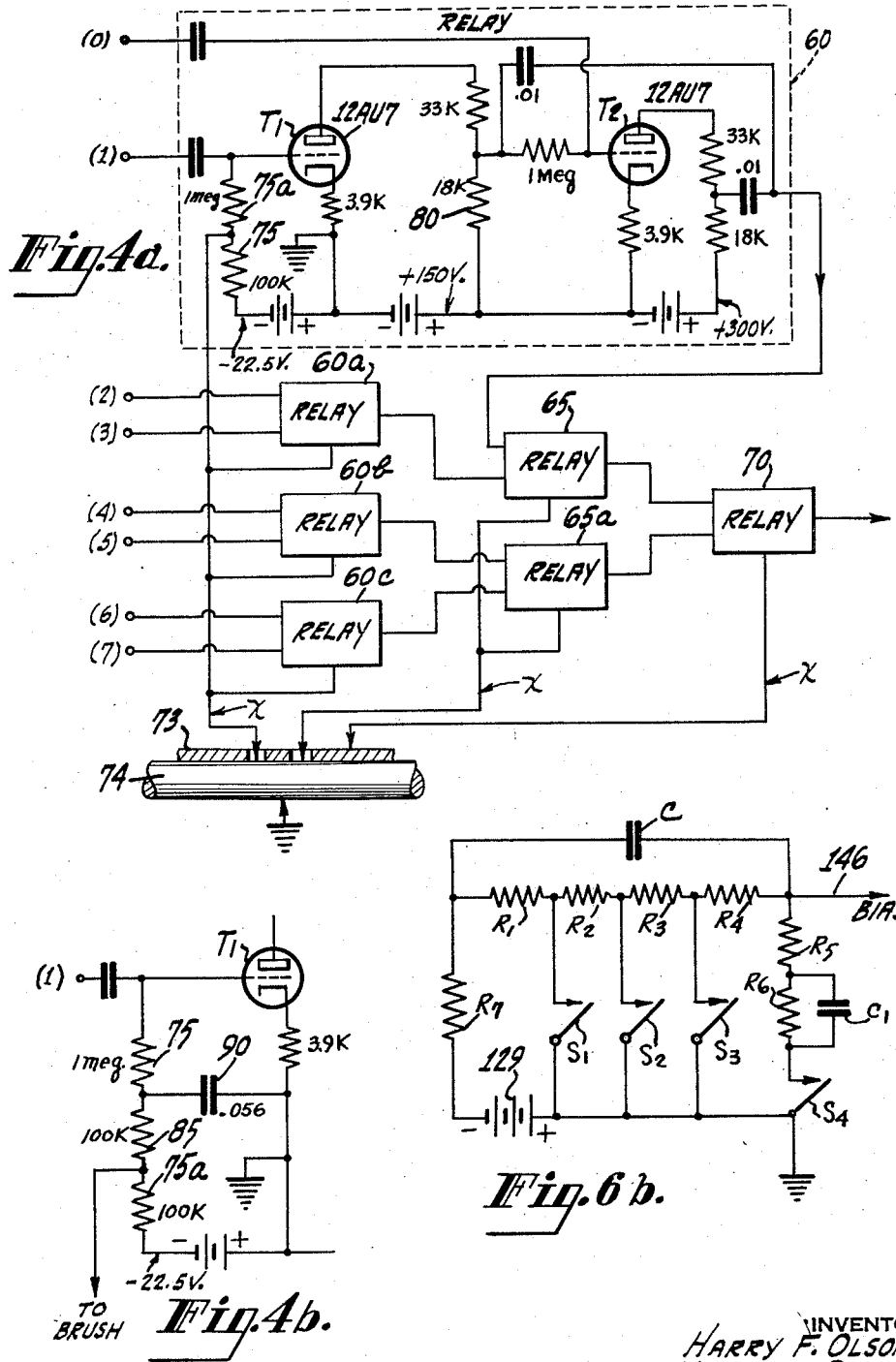
INVENTORS
HARRY F. OLSON AND
HERBERT BELAR
BY Floyd M. Harris
ATTORNEY

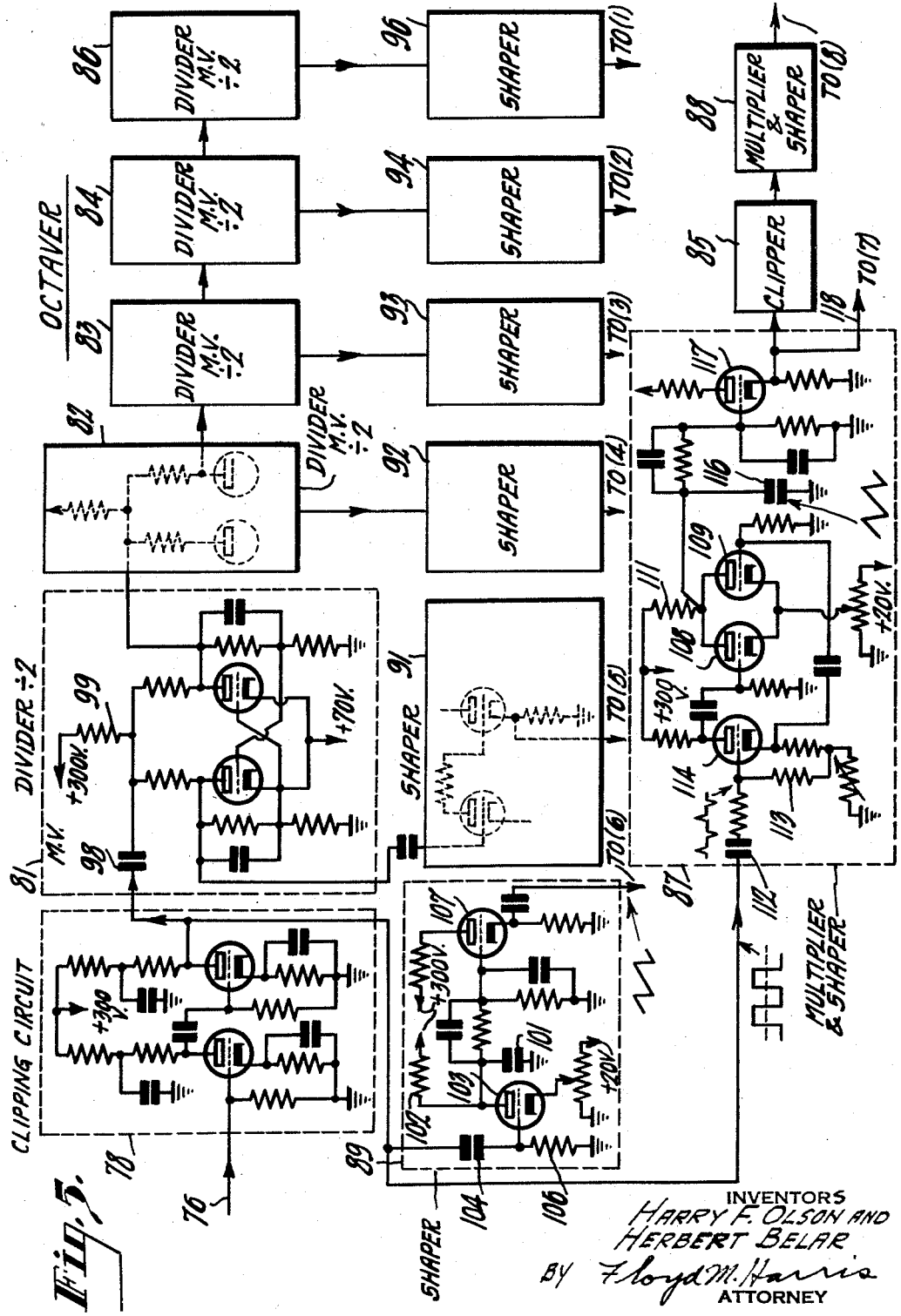

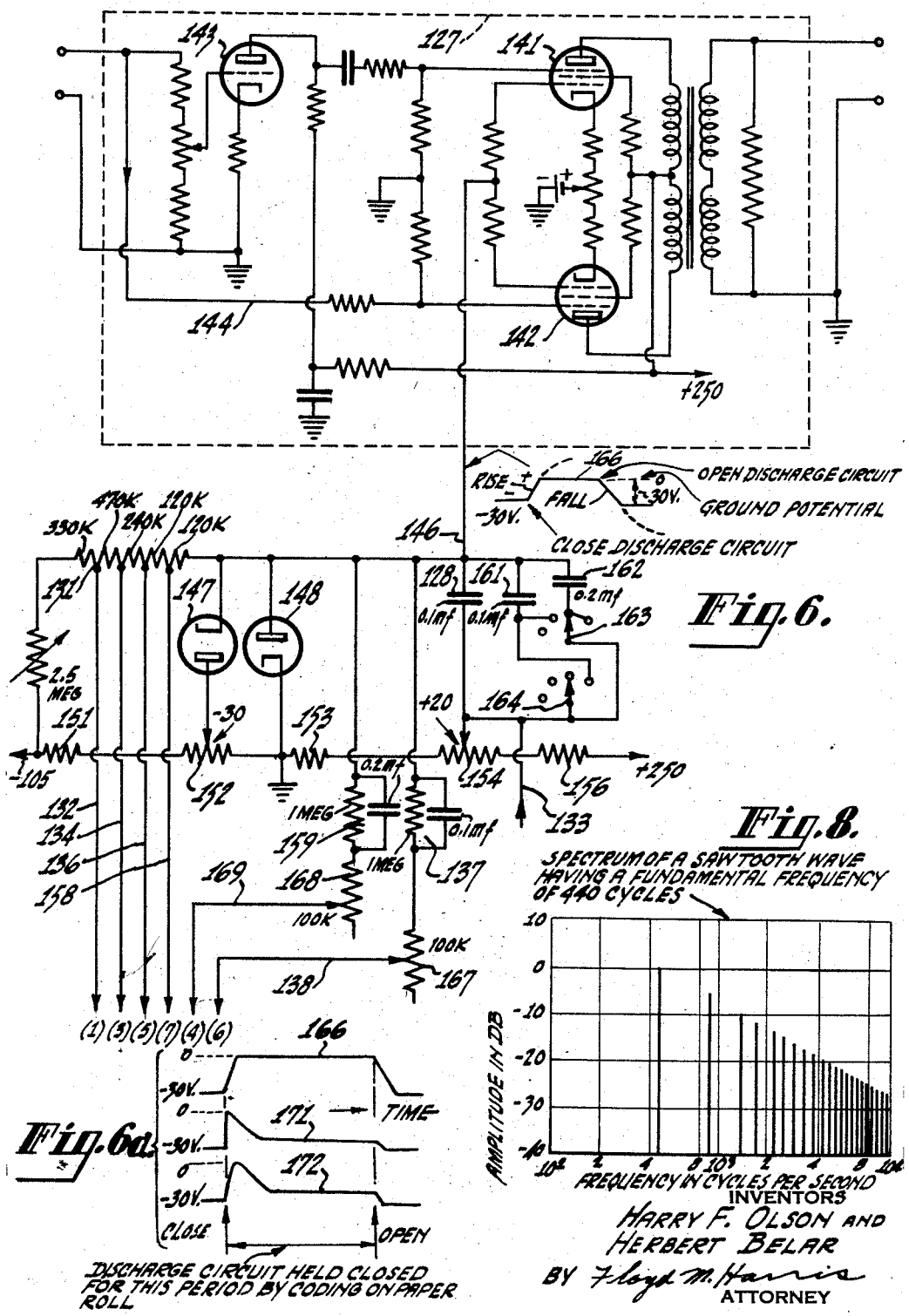

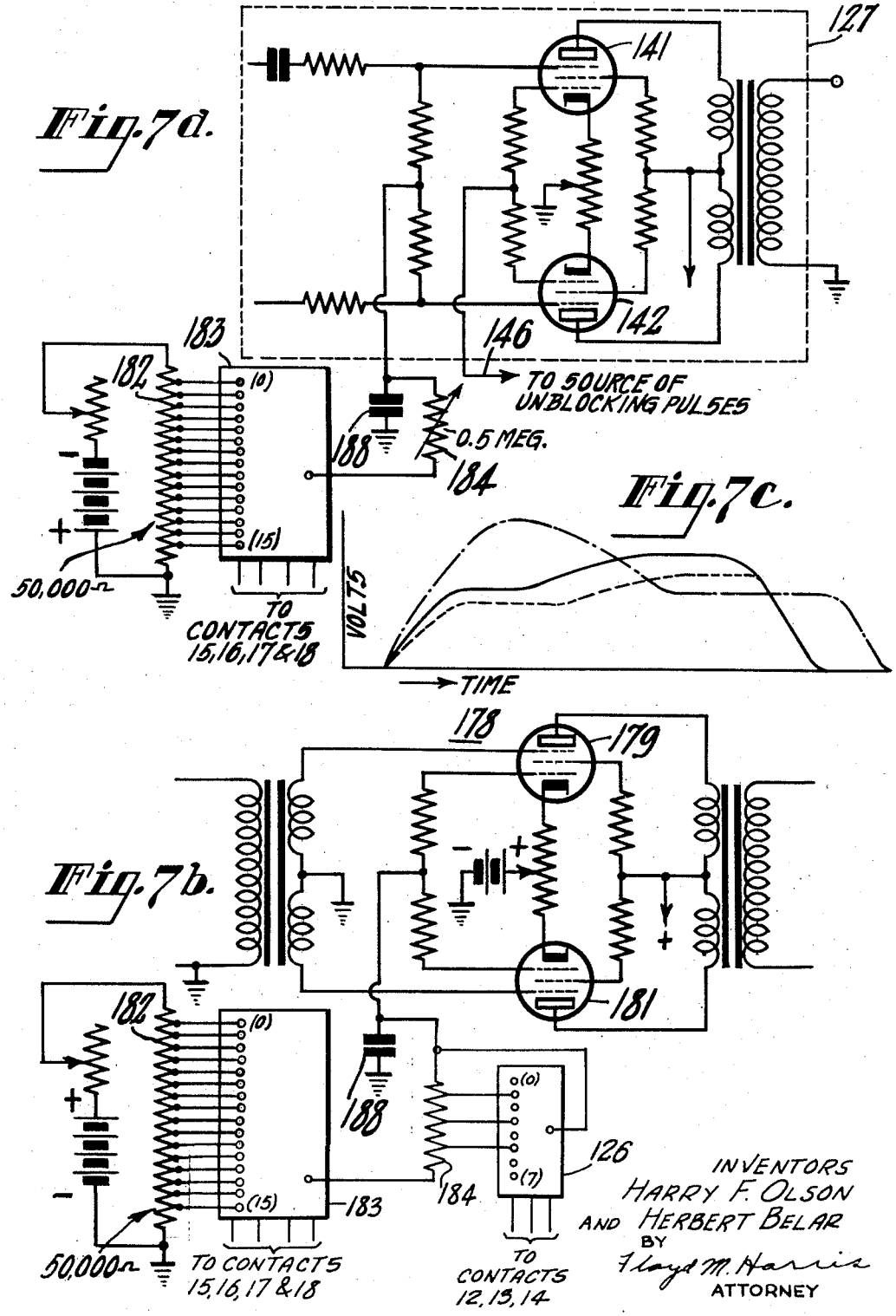

Oct. 14, 1958 H. F. OLSON ET AL 2,855,816
MUSIC SYNTHESIZER
Filed Dec. 26, 1951 19 Sheets-Sheet 10

INVENTORS
HARRY F. OLSON AND
HERBERT BELAR
BY Floyd M. Harris
ATTORNEY

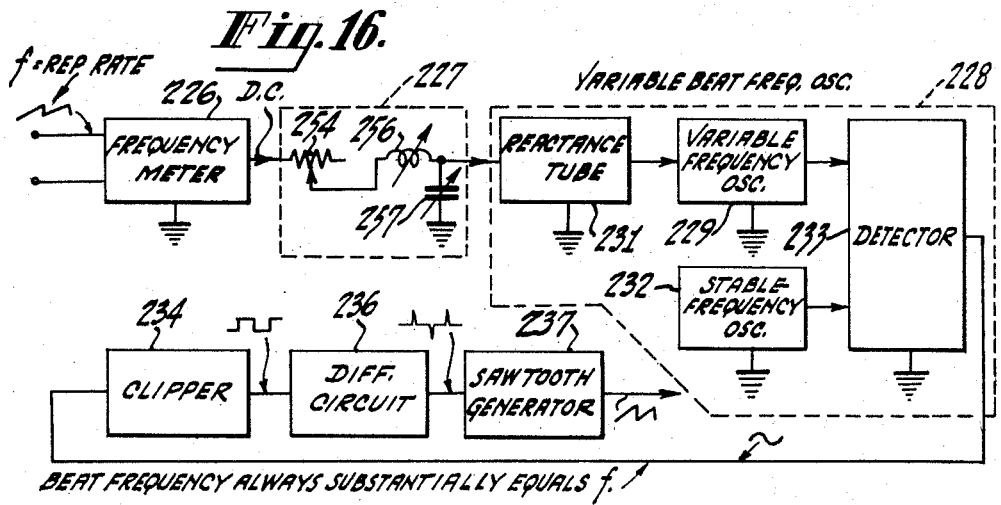

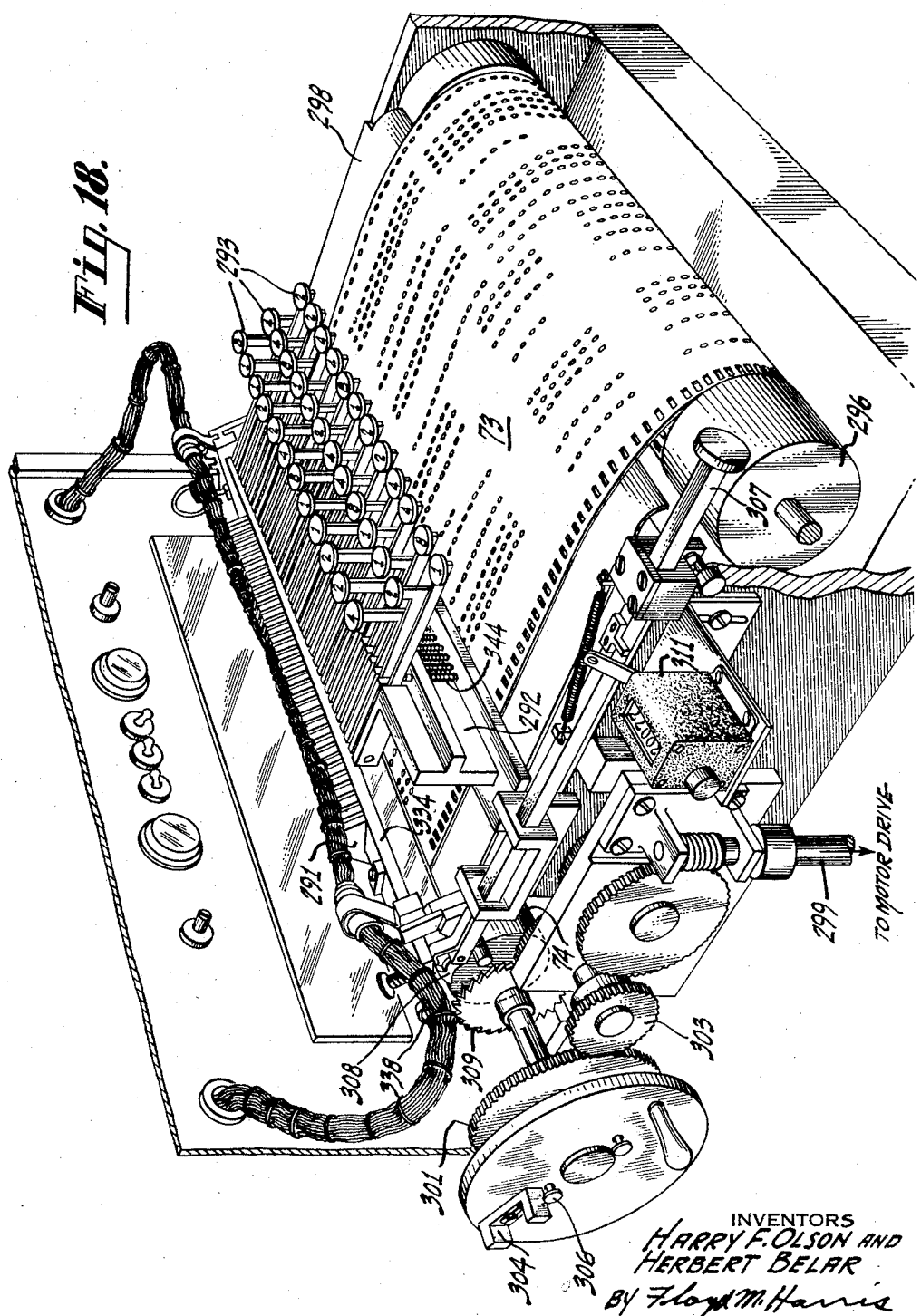

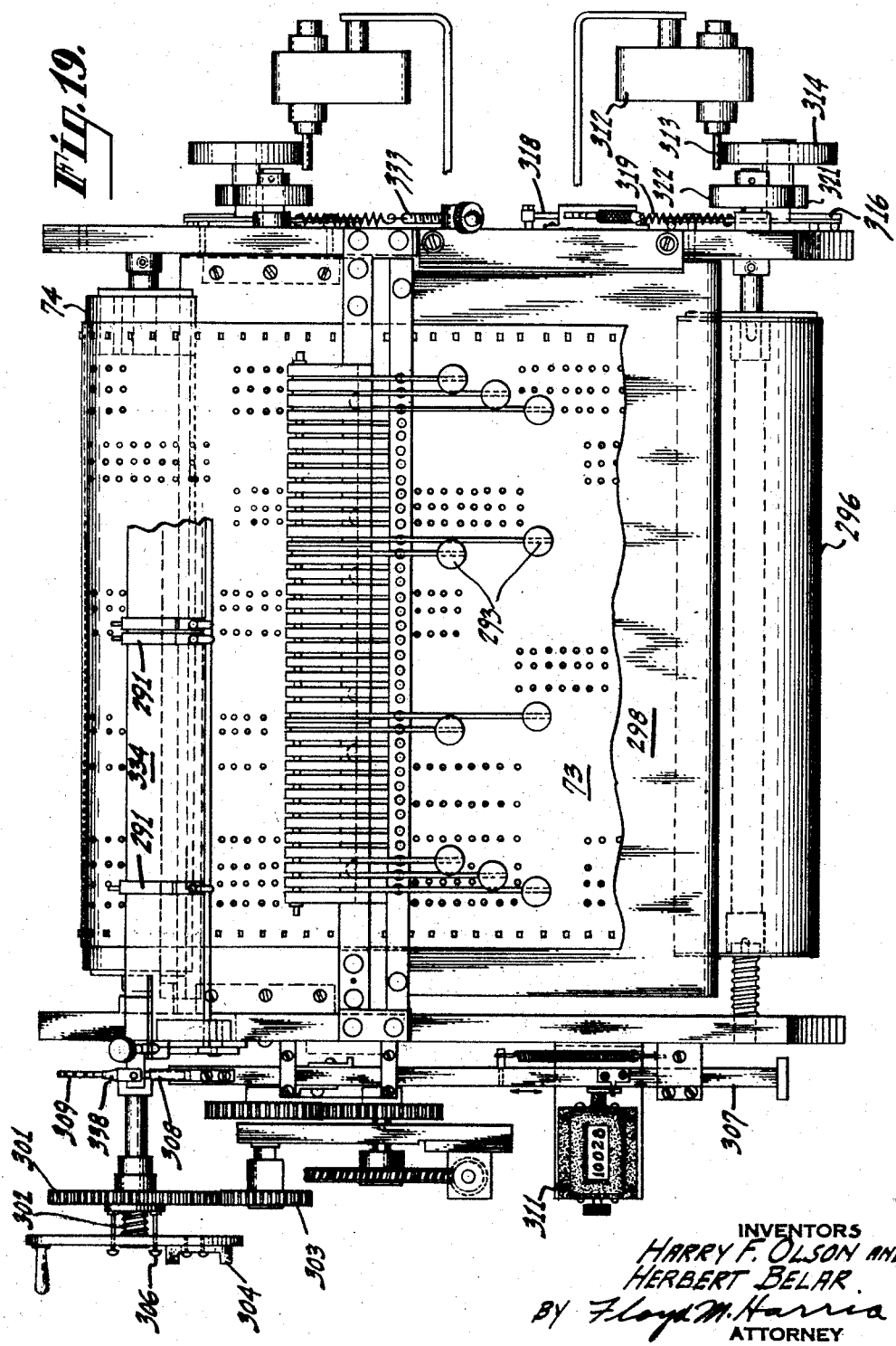

Oct. 14, 1958     H. F. OLSON ET AL     2,855,816
MUSIC SYNTHESIZER

Filed Dec. 26, 1951     19 Sheets—Sheet 16

INVENTORS
HARRY F. OLSON
AND HERBERT BELAR
BY Floyd M. Harris
ATTORNEY

Oct. 14, 1958   H. F. OLSON ET AL   2,855,816
MUSIC SYNTHESIZER
Filed Dec. 26, 1951   19 Sheets-Sheet 18

INVENTORS
*HARRY F. OLSON AND*
*HERBERT BELAR*
BY *Floyd M. Harris*
ATTORNEY

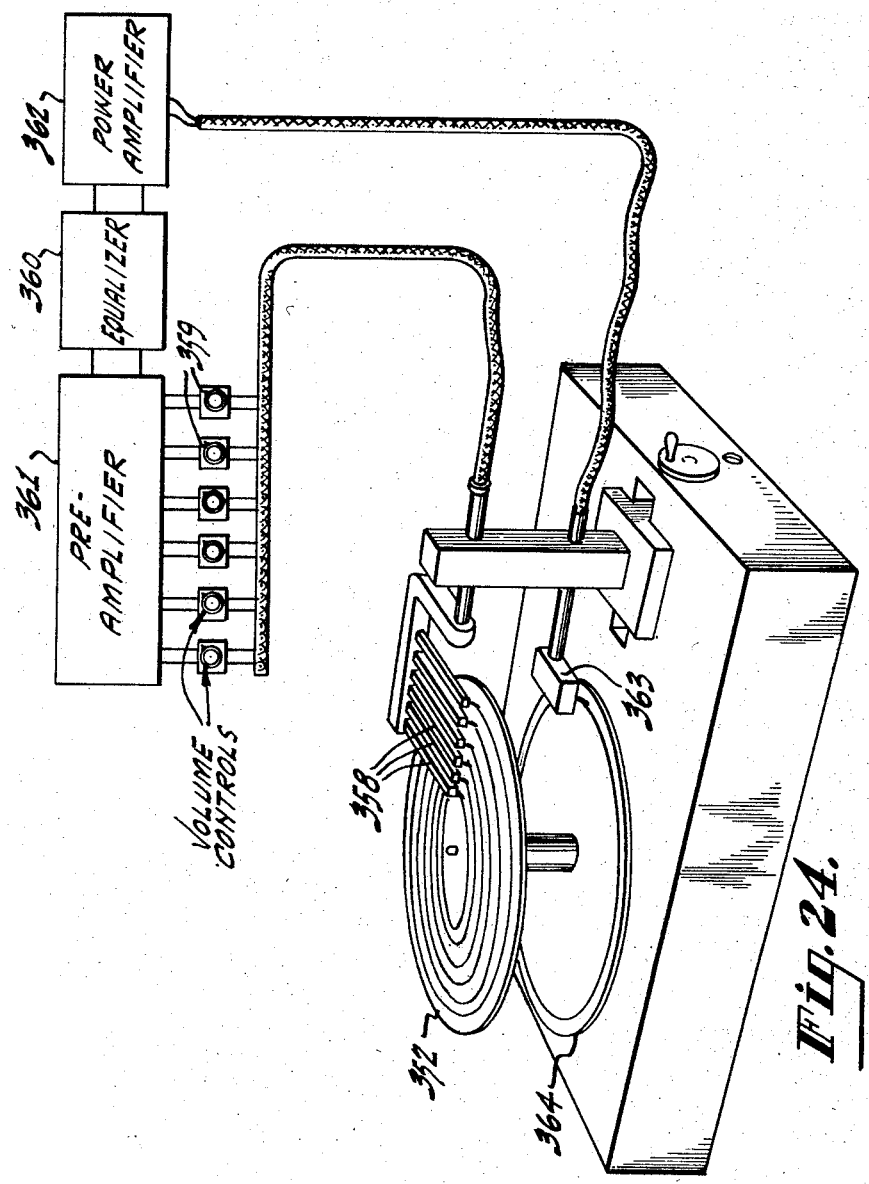

United States Patent Office 2,855,816
Patented Oct. 14, 1958

2,855,816

MUSIC SYNTHESIZER

Harry F. Olson, Princeton, and Herbert Belar, Palmyra, N. J., assignors to Radio Corporation of America, a corporation of Delaware Application December 26, 1951, Serial No. 263,252

50 Claims. (Cl. 84—1.03)

Our invention relates to the synthesis of music and particularly to methods and means for producing any predetermined tone, combination or series of tones.

An object of the invention is to provide an improved method of and means for synthesizing music.

A further object of the invention is to provide an improved method of and means for producing a series of synthesized tones under the control of a suitable coded record such as a punched paper roll or tape.

A still further object of the invention is to provide a method of and means for selecting tones of a musical scale in rapid succession in accordance with a coded record and for determining in accordance with a coded record the envelope shape and spectrum of the selected tone.

A still further object of the invention is to provide a method of and means for selecting tones of a musical scale in rapid succession in accordance with a coded record and for determining in accordance with a coded record the rate of rise, the duration and the decay of the selected tone and also the amplitude and the spectrum of the selected tone.

A still further object of the invention is to provide a method of and means for selecting tones of a musical scale in rapid succession in response to a coded record and for changing a characteristic of a selected tone while it is being sounded.

A still further object of the invention is to provide an improved method of and means for producing a phonograph, tape, film, or other record by synthesizing and recording the desired music.

A still further object of the invention is to provide an improved method of and means for operating a music synthesizer without obtaining clicks and other undesired noise in the synthesizer output.

A still further object of the invention is to provide an improved method of and means for obtaining a vibrato effect in the synthesizer output.

A still further object of the invention is to provide an improved method of and means for obtaining a frequency glide or portamento in a music synthesizer output.

It may aid in understanding the invention first to indicate some of the results that may be obtained by using our synthesizer. It may be used to produce a record of a piano solo that will sound as though a good musician were playing an actual piano. Furthermore, effects can be obtained that would be technically impossible for a musician to produce by playing a piano.

The synthesizer may be used to record synthesized orchestra music. When such a record is played on a phonograph, it will sound as though an actual orchestra had made the recording.

The synthesizer may be used to record violin or trumpet solos, or the like. Also, it may be used to obtain effects impossible to obtain with actual musical instruments.

Stated briefly, these results are accomplished in part by cascading in a synthesizer channel a plurality of units for controlling the characteristics of a selected tone, and by controlling the several units in accordance with the coding of a coded record.

*Physical properties of sound*

Before describing the invention in detail, it will be helpful first to point out that the physical properties of a sound are frequency, intensity, waveform and time. The psychological characteristics of a sound which depend upon the physical properties are pitch, loudness, timbre, and time. A tone is a sound wave capable of exciting an auditory sensation having pitch. Thus the properties of a tone are frequency, intensity, waveform, and time. It is more convenient to describe the properties of a tone in terms of frequency, intensity, waveform, growth, duration, decay, and vibrato. These properties of a tone are described below.

A. *Frequency—Pitch.*—Frequency of a sound wave is the number of cycles occurring per unit of time.

Pitch of a sound wave is the psychological counterpart of frequency. The pitch of a sound is that attribute of auditory sensation in terms of which sounds may be ordered on a scale extending from low to high, such as a musical scale. Pitch depends primarily upon the frequency of the sound stimulus, but it also depends upon the sound pressure and waveform of the stimulus.

B. *Intensity—Loudness.*—The sound intensity in a sound field in a specified direction at a point is the sound energy transmitted per unit of time in a specified direction through a unit area normal to this direction at the point.

Loudness of a sound is the psychological counterpart of intensity. Loudness is the intensity attribute of an auditory sensation, in terms of which sounds may be ordered on a scale extending from soft to loud. Loudness depends primarily upon the intensity of the stimulus, but it also depends upon the frequency and waveform of the stimulus.

C. *Waveform—Timbre.*—A complex sound wave is made up of the fundamental frequency and harmonics or overtones.

A complex sound wave may be described in the form of the sound spectrum.

Timbre depends primarily upon the sound spectrum of the stimulus, but it also depends upon the intensity and the frequency location of the spectrum of the stimulus.

From a psychological standpoint, timbre is that attribute of auditory sensation in terms of which a listener can judge that two sounds similarly presented, and having the same loudness and pitch, are dissimilar.

D. *Growth.*—The growth of a sound is the time required for a sound to build up to some fraction of its ultimate value.

E. *Duration.*—Duration is the time that a sound persists.

F. *Decay.*—The decay of a sound is the time required for a sound to fall to some fraction of original intensity.

G. *Vibrato.*—The vibrato is a complex modulation of sound involving either frequency, amplitude or waveform modulation or all three.

From a psychological standpoint, the vibrato involves a periodic change in pitch, loudness, timbre or all three.

*General description of synthesizer*

Any musical tone whatsoever may be synthesized if the synthesizer is provided with the following facilities: Means for producing a tone with any fundamental frequency within the audio frequency range. Means for producing a tone with any overtone structure. Means for producing a tone of any growth, duration or decay characteristic. Means for changing the overtone structure at any time. Means for changing the intensity of the tone at any time. Means for introducing a vibrato. Means for providing a portamento or glide from a tone of one frequency to a tone of a different frequency. Means for providing a deviation from the regular.

In accordance with a preferred embodiment of the present invention the above-mentioned facilities are provided in an electronic system whereby any tone produced by a musical instrument may be synthetically generated by said system.

In the case of conventional musical instruments, the musician is limited to the use of ten fingers and two feet to perform the different operations. This limitation does not exist in our synthesizer.

In accordance with one preferred embodiment of the invention each individual note is synthesized under the control of a punched paper roll or other suitable coded record. The synthesizer output under the control of said paper roll record may be the music of a violin or a trumpet, for example. In this case, whether the output is being heard directly or is being recorded, a single synthesizer channel might be employed but preferably two synthesizer channels are employed so that they may produce notes alternately or overlapping as explained hereinafter. If the direct (unrecorded) output of the synthesizer is to be the music of a piano or orchestra, for example, the number of synthesizer channels must be greatly increased.

While not limited to such use, it seems probable that the principal use for our electronic music synthesizer will be for the production of phonograph records, in which case a two channel synthesizer is all that is required. By successively recording the music of different instruments as played by the synthesizer and then re-recording, the music of a full orchestra, for example, may be recorded on a phonograph record. In a similar manner, piano or organ music can be put on a phonograph record, repeated recordings being made to get recorded notes, such as chords, that are played simultaneously from the completed phonograph record.

In practicing one preferred embodiment of the invention a plurality of frequency sources, such as twelve tuning fork sources, are selectively connected through switches to an octaver. Each frequency source corresponds to one note of the musical scale.

The desired octave for a selected note is selected by switches to which the octaver is connected, and the selected output is passed through an envelope shaping and keying amplifier.

The frequency source selection and the octave selection are under the control of a coded paper record that, by the coding punched therein, determines which selecting switches are operated.

The shaping and keying amplifier is controlled by a switching circuit that selects the desired envelope shaping circuit for determining particularly the growth and decay of the signal passed by said amplifier. This amplifier, which is under the control of the coded paper record, also functions as a keying amplifier to open and close the synthesizer channel to the passage of signal.

The synthesizer channel also includes a master volume control unit and a signal spectrum controller unit that are selectively controlled by switches operated by the coded paper roll. These units, the octaver unit, and the shaper and keyer unit are all in cascade with the selected frequency source. The master volume control unit, through the coding, determines the volume of each note. The spectrum controller unit comprises filters and other networks that, through the coding, determine the spectrum of the note. To a large extent the spectrum of the note is determined by its harmonic content.

In addition, the synthesizer channel preferably includes means for connecting in cascade with the other units either a vibrato unit or a portamento unit or both. Whether either or both is to be used depends on the music to be played.

The number of switch contacts and the size of the punched paper roll have been reduced, as compared with that required by straight switching, by employing a binary switching arrangement known as a relay tree, and by punching the paper roll in binary code for actuating the relay tree. These relay trees connect the tuning fork sources to the octaver, the octaver to the envelope shaper and keyer et cetera.

It should be understood that the invention is not limited to the use of the particular type of coding or to the particular type of coded record that is described herein by way of illustration.

The term coded record as used in this application refers to any storage device containing control information. The coded record might be one or more photographic films or one or more magnetic tapes with control information thereon.

The music synthesizer, preferably includes a second synthesizer channel following the tuning forks that is a duplicate of the first channel described above. This makes it possible for the coded paper roll to set up a note on one channel while a note is being played on the other channel. It also makes it possible to start playing a note before the preceding note has ended.

Other objects, features, and advantages of the invention will be apparent from the following description taken in connection with the accompanying drawing in which:

Figs. 2a and 2b are block and circuit diagrams that are to be placed end to end and which show in more detail one of the music synthesizer channels of Fig. 1;

Fig. 3 is a circuit diagram of a suitable tuning fork source that may be employed in the apparatus of Figs. 1 and 2a;

Fig. 4 is a circuit diagram of a random noise or hiss generator that may be included in the apparatus of Figs. 1 and 2a;

Fig. 4a is a circuit and block diagram of a vacuum tube relay circuit that may be used in place of the mechanical relay arrangement shown in Fig. 2a;

Fig. 4b is a circuit diagram of a modification that may be made in the circuit of Fig. 4a;

Fig. 5 is a circuit and block diagram of the octavers shown in Figs. 1 and 2a;

Fig. 6 is a circuit diagram of the envelope shaper and keyer units shown in Figs. 1 and 2b;

Fig. 6a is a group of graphs that are referred to in explaining the operation of the envelope shaper and keyer shown in Fig. 5;

Fig. 6b is a circuit diagram showing another embodiment of a portion of the envelope shaping and keying circuit;

Fig. 7 is a circuit diagram showing a master volume control unit that may be employed in the apparatus shown in Fig. 1;

Figs. 7a and 7b are circuit diagrams of two embodiments of features of the invention each showing an envelope shaping and keying circuit and a volume control circuit combined as a single unit;

Fig. 7c is a group of graphs that are referred to in explaining the operation of the circuit shown in Fig. 7b.

Fig. 8 is a diagram showing the spectrum of a sawtooth wave;

Fig. 16 is a block and circuit diagram of the frequency glider or portamento unit shown in Fig. 1;

Fig. 16a is a circuit diagram of the frequency meter shown in Fig. 16;

Fig. 16b and 16c are circuit diagrams of different filters that may be used in the frequency glider unit of Fig. 16;

Fig. 16d is a group of graphs that are referred to in explaining the operation of the frequency glider;

Fig. 18 is a view in perspective of what may be referred to as the machine panel comprising the paper roll feed mechanism and the contact switches, and is also a view of the paper punching mechanism for coding the paper roll;

Fig. 19 is a plan view of the machine panel shown in Fig. 18;

Fig. 24 is a view in perspective of a re-recording system for producing a final phonograph record in accordance with the present invention.

In the several figures similar parts are indicated by similar reference characters.

One particular embodiment of the invention will now be described, by way of example, first with particular reference to Figs. 1, 2a, and 2b. Figs. 2a and 2b show a single synthesizer channel of Fig. 1 in greater detail than shown in Fig. 1.

The frequency sources

Figure 1:
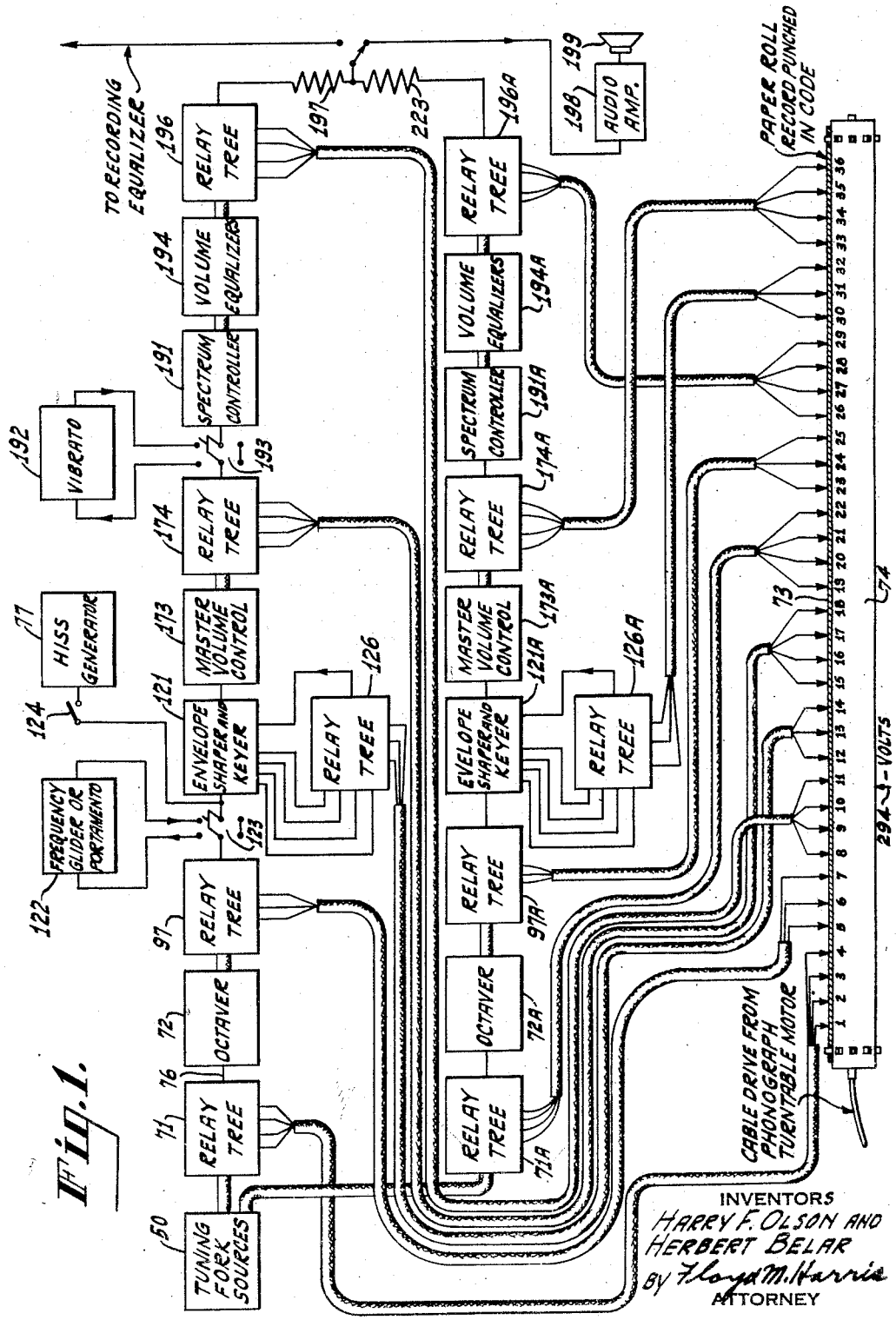
Fig. 1 is a block diagram illustrating one embodiment of the invention.
Figure 2B:
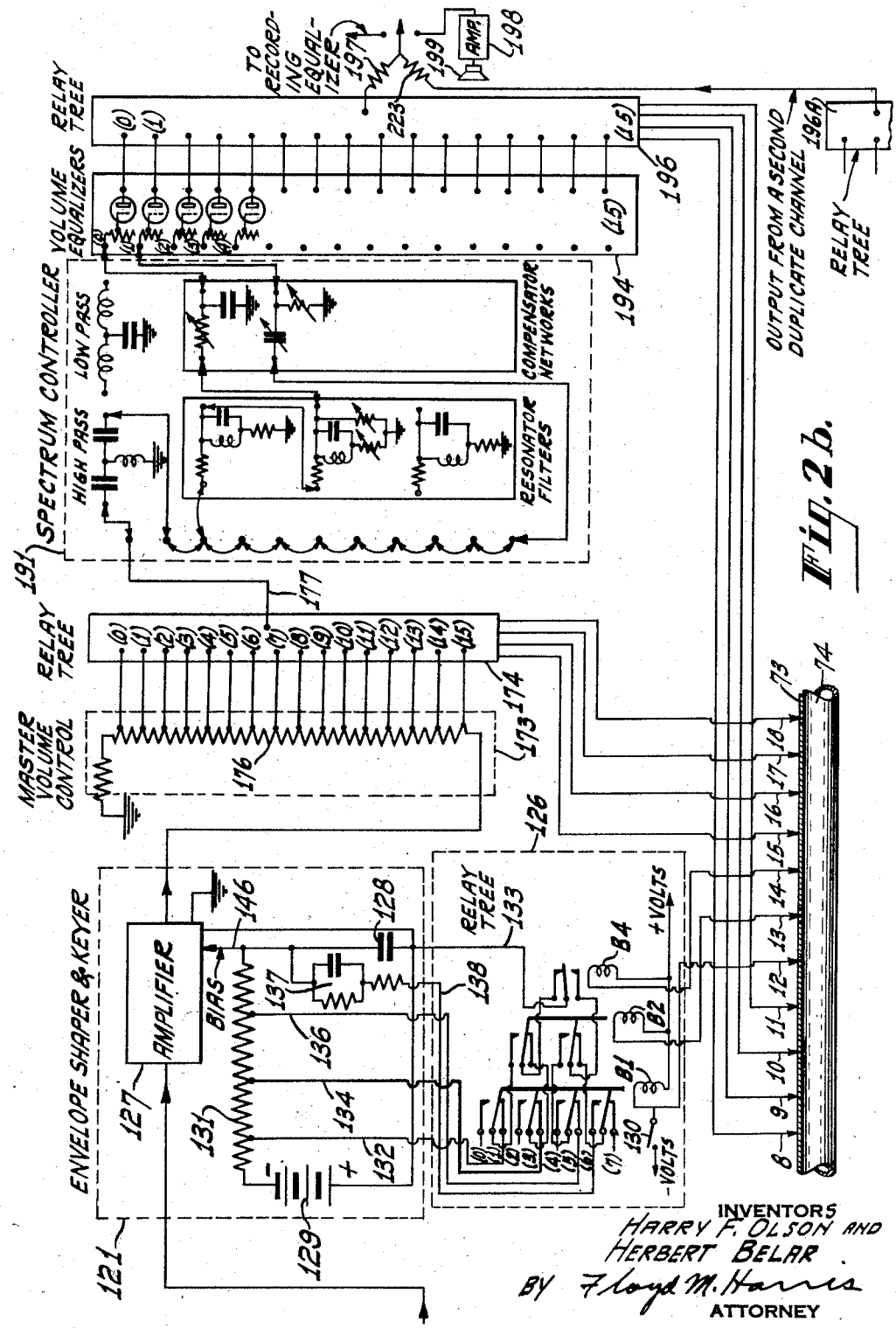

In Figs. 1 and 2a, the signal frequency sources, such as tuning forks, are indicated by the block 50. In Fig. 2a the individual tuning fork sources are indicated by blocks which have marked on them the approximate frequency of the fork in cycles per second. In Fig. 2a there is also shown in the block 50 a random noise or hiss source marked "hiss" that is useful in synthesizing sounds such as those from a snare drum, for example. In addition there is shown in the block 50 a mixer that may be utilized for mixing the outputs of all the tuning forks or any desired number of them for obtaining special effects. All or part of the tuning fork sources may be connected into the mixer for obtaining certain effects.

The outputs of the twelve fork sources shown in Fig. 2a correspond to the twelve notes in the equally tempered scale. Instead of tuning forks one may employ tone wheels, oscillators, or any other suitable signal source.

Fig. 3 shows an example of a suitable tuning fork source that is designed to hold at an exact frequency. It is possible to hold the fundamental frequency to an accuracy of better than one part in ten thousand. The source comprises a tuning fork 51 with a driving coil 52 and a pick-up coil 53. The pick-up coil applies tuning fork signal to the input of an amplifier tube 54. This signal is amplified and applied to amplifier tube 56 which feeds signal by way of a capacitor 57 to the driving coil 52 to sustain the tuning fork oscillations.

Negative feedback is provided to obtain a more perfect sine wave output. This feedback is from the anode of tube 56, through capacitor 57, resistor 58, and the lead 59 to the cathode of tube 54.

The fork output is taken off the anode of tube 56 and supplied to a clean-up filter, and is tuned sharply to the desired frequency, such as 739 cycles per second, to eliminate any undesired frequency components introduced by lack of perfection in the tuning fork and associated circuit.

A suitable random noise or hiss circuit is shown in Fig. 4. It may comprise a gas tube 63 and an amplifier 64 for amplifying the noise generated in the gas tube.

The relay tree

Referring again to Figs. 1 and 2a, a binary relay switching arrangement or relay tree 71 is employed for connecting any desired tuning fork source to the input of an octaver 72. A relay tree of this type is described in periodical, Electrical Engineering, page 958, volume 68, 1949. By employing a binary switching arrangement in combination with a coded record such as a punched paper roll, it has been possible to reduce very greatly the number of contacts required at the coded record.

In Figs. 1, 2a, and 2b a punched paper roll is indicated at 73. This paper roll passes between brushes or contact points numbered 1 to 36, inclusive, and a metal contact and driving roller 74 having sprockets at each end. When a hole in the paper roll falls under a brush, a relay coil connected to said brush is energized to pull down the associated relay armatures.

Thus in Fig. 2a the brushes 1, 2, and 4 are in contact with roller 74 and the associated relay coils 1a, 2a, and 4a, have pulled down the relay armatures. Relay coil 3a is not energized. It will be seen that the output lead 76 of the relay tree 71 is, with this coding of the paper roll, connected to the tuning fork source of 1318 cycles per second.

It will be noted that the input terminals of the relay tree 71 are marked (0) to (15), inclusive, in accordance with the punched codes on the paper roll that connect a particular input terminal to the output lead 76. In the binary system the brushes 1, 2, 3, and 4 which control relay tree 71 correspond to the numbers 1, 2, 4, and 8, respectively. Thus in the example illustrated the code calls for input number (11) since 1+2+8 equals 11. With such a coding scheme it is a comparatively simple matter to code a paper roll in accordance with a particular piece of music.

It should be noted that the brushes 1, 2, 3, and 4 might be connected to relay coils 4a, 3a, 2a, and 1a, respectively, instead of as shown. In that case the relay input terminals would not be numbered (0) to (15) from top to bottom in numerical sequence. Either arrangement is satisfactory.

From the foregoing, it will be apparent that by means of a four-hole code it is possible to connect any desired one of the tuning fork sources to the octaver 72. Also, the hiss source may be connected to the octaver 72 by having the proper code punched in the paper roll. In the present example said proper code consists of holes punched to let brushes 2, 3, and 4 make contact with the roller 74 since they correspond to the binary numbers 2, 4, and 8 which add up to 14. Note that the hiss generator is connected to input terminal number (14).

With the hiss generator located in the circuit as shown in Fig. 2a, the paper roll would ordinarily be coded to connect the hiss generator to the octaver each time a sound or note is played. That is, a phonograph record track would be cut using hiss alone.

The octaver has a peculiar effect on the hiss output which will be discussed later. As will be shown later, it is desirable at times to utilize a hiss generator without having the hiss go through the octaver, this, perhaps being the more useful way of utilizing hiss. A hiss generator connected for such use is shown at 77 in Fig. 1.

It should be understood that various relay arrangements other than the one illustrated may be employed. For example, the folded relay tree, which is well known in the art, may be used.

Also, instead of mechanical relays, vacuum tube relays may be employed. For example, in Fig. 4a there is shown a relay tree comprising vacuum tube relays.

In the example shown the relay tree has eight input terminals. It comprises a first group of four tube relays 60, 60a, 60b, and 60c. This group corresponds to the relay coil 2a and associated contacts in Fig. 2a. It further comprises a second group of relays 65 and 65a, and a final relay 70. All these relays are the same as the relay 60 which is shown in circuit diagram.

Referring to relay 60, it comprises vacuum tubes T1 and T2 which have a common output circuit. They have connected to their control grids, respectively, input leads from input terminals (0) and (1). Coupling capacitors are included in the input leads. In operation either one tube or the other functions to pass signal. The two vacuum tubes are direct-current coupled. While batteries are shown for the operating voltages and for part of the biasing voltages, it will be understood that a voltage divider with taps therealong may be used instead.

The bias to the grid of tube T1 is applied from the bias battery through resistors 75 and 75a. Part of the grid bias for tube T1 is provided by a cathode resistor. The bias to the grid of tube T2 is applied through a resistor 80. If the tube T1 is conducting, the drop in resistor 80 together with the bias provided by a cathode resistor is sufficient to bias the tube T2 to cut-off so that it does not pass signal. If tube T1 is not conducting, there is no drop across resistor 80, and tube T2 passes any signal applied at input terminal (0).

Whether tube T1 is conducting or not depends on whether the junction point of resistors 75 and 75a is grounded or not. If this point is not grounded, the bias supplied by the biasing battery is sufficient to bias tube T1 to cut-off so that it will not pass signal. If said point is grounded, the grid resistor 75a is connected to the cathode of tube T1 so that tube T1 becomes conducting and functions to pass any signal applied at the input terminal (1).

Thus, the relay 60 may be switched to pass one input or the other by connecting the junction point of resistors 75 and 75a to a brush that will make contact with the roller 74 (grounded in this case) when a punched hole in the paper record 73 passes under the brush.

As indicated in Fig. 4a, the relays 60, 60a, 60b, and 60c have corresponding junction points all connected to the same brush. In the example shown, all these junction points are grounded through a code hole so that this group of four relays are switched to pass signal from input terminals (1), (3), (5), and (7).

The operation of the remaining relays 65, 65a, and 70 of the relay will be apparent from the foregoing description. The relays 65 and 65a, of course, correspond to the relay coil 3a and associated contacts in Fig. 2a. The relay 70 corresponds to the relay coil 4a and associated contacts in Fig. 2a.

The relay tree of Fig. 4a may be adjusted so that there is one to one gain through the relay tree as illustrated or it may be adjusted to provide amplification.

Fig. 4b shows a portion of a tube relay, such as relay 60, modified to produce a less abrupt switching from one relay tube to the other, i. e., such as from tube T2 to tube T1. This modification consists of the insertion of a resistor-capacitor circuit or filter in the input circuit of tube T1. It comprises a resistor 85 inserted between resistors 75 and 75a, and a capacitor 90 connected between the junction point of resistors 75 and 85 and the cathode of tube T1.

When the lead to the brush is ungrounded, the capacitor 90 is charged to the bias battery voltage and tube T1 is cut-off. When this lead is grounded, the charge on capacitor 90 leaks off at a rate depending on the values of said capacitor and the resistor 85. Thus the switching over from tube T2 to tube T1 may be made at a controlled rate. Similarly, when ground is taken off the brush lead, the capacitor 90 charges at a controlled rate so that tube T1 is not biased to cut-off abruptly. A resistor-capacitor filter of this type preferably is included in all the tube relays of the relay tree. A filter may be included in each individual relay as indicated, or a filter may be inserted in the common brush leads of each relay group at the points X indicated in Fig. 4a. In Figs. 4a and 4b there are shown by way of example the tube type, the voltages, and the circuit values in microfarads, thousands of ohms, and megohms.

The octaver

The octaver 72 is a unit for producing a selected note in any desired octave within the range of the synthesizer. In the specific circuit shown by way of example the octaver comprises both dividing and multiplying circuits. The octaver might comprise dividers only or multipliers only, particularly if different frequency signal sources are selected. Obviously, the invention is not limited to the particular dividing or multiplying circuits employed.

It should first be noted that each octaver output is a sawtooth wave. A sawtooth wave is very satisfactory because it is rich in all the harmonics of the fundamental frequency. Outputs of other wave shapes might be employed. For example, in synthesizing the tones of some instruments it may be desired to use a wave shape having only odd harmonics, such as a square wave, or a wave shape having only even harmonics.

Referring particularly to Figs. 2a and 5, the lead 76 applies the selected signal to a clipping circuit 78 of the octaver 72. The clipper 78 may consist of two vacuum tubes in cascade which are biased so that one tube clips the top and the other the bottom of the applied wave. Thus an applied sine wave will be clipped to produce substantially a square wave.

The output of the clipper 78 goes to a frequency divider channel comprising frequency dividers 81, 82, 83, 84, and 86, each of which divides by two. It also goes into a frequency multiplier channel comprising frequency multipliers 87 and 88, each of which multiplies by two. The output of clipper 78 also goes to a shaping circuit 89 where it is shaped into a sawtooth wave without any frequency division or multiplication.

The outputs of the dividers are supplied to shaper circuits 91, 92, 93, 94, and 96 to produce sawtooth waves having repetition rates or fundamental frequencies that are the same as the frequencies of the divider outputs.

The frequency multipliers 87 and 88 multiply by two and feed into shaping circuits, included in the blocks 87 and 88, for producing sawtooth waves having repetition rates equal to the multiplied frequencies. A clipping circuit 85 is included in the connection between the two multipliers for converting the sawtooth wave into a square wave.

It will be seen that there are eight sawtooth outputs from the octaver 72 so that any note selected by the relay tree 71 may be played in any one of eight octaves.

The octave selection is accomplished by means of a second relay tree 97 which is the same as the relay tree 71 except that the sixteen contact relay and its associated relay coil, corresponding to coil 1a, are omitted since only eight input terminals are required. Relay tree 97 is controlled from the brushes 5, 6, and 7 in association with a three-hole code in the paper roll.

The sawtooth outputs of the octaver are supplied to the input terminals of relay tree 97 as shown, the lowest frequency sawtooth wave being applied to input terminal number (1), the next higher frequency sawtooth wave being applied to input terminal number (2), et cetera up to and including the next to the highest frequency which is connected to input terminal number (7). In the particular example shown the highest frequency sawtooth wave is connected to input terminal number (0). Obviously, the lowest to highest frequency sources might be connected to terminals number (0) to number (7), respectively.

Now referring again to Fig. 5, the frequency dividers may be multivibrators, such as shown in the block 81, which supply a square wave output. The multivibrator or MV circuit is conventional and needs no detailed description. It may be noted that the coupling capacitor 98 and the common anode resistor 99 differentiate the applied square wave so that a sharp trigger pulse is injected into the multivibrator.

For obtaining a sawtooth wave there are various sawtooth generating circuits that are suitable. The particular shaper circuit employed in the present octaver is shown in detail in the block 89. It comprises a capacitor 101 that is charged gradually through a plate resistor 102 and is discharged suddenly through a vacuum tube 103.

The tube 103 is biased to cut-off by a positive voltage on its cathode. The discharge of capacitor 101 occurs in response to the occurrence of positive pulses obtained by differentiating the square pulses from clipping circuit 78. The capacitor 104 and resistor 106 function as a differentiating circuit.

From the foregoing it will be seen that each shaper produces a sawtooth wave having the same fundamental frequency as that of the square wave applied to it.

Referring again to the shaper 89, the sawtooth wave appearing across the capacitor 101 is supplied to an output lead through a wide band circuit that passes substantially all the frequency components of the sawtooth wave. This circuit comprises a cathode follower tube 107 that has its input direct-current coupled to the plate end of capacitor 101. Suitable coupling between tubes 103 and 107, well-known in the art, for holding up the high frequency gain and the low frequency gain is employed.

A specific multiplier and a shaper are shown in the block 87 of Fig. 5 merely as one example of suitable circuits.

The frequency multiplier comprises vacuum tubes 108 and 109 that have a common anode resistor 111. The cathodes of tubes 108 and 109 are biased sufficiently positive to cause the tubes to pass positive applied pulses only.

The input pulses applied to the grids of tubes 108 and 109 are the pulses obtained by differentiating the square wave from the clipper 78. This square wave is differentiated by the capacitor 112 and the resistor 113 in the input circuit of an amplifier tube 114. Reversed polarity differentiated pulses are applied from the anode of tube 114 to the grid of tube 108. Differentiated pulses of unchanged polarity are applied from the cathode of tube 114 to the grid of tube 109. Thus a double frequency signal appears at the common output of tubes 108 and 109.

The tubes 108 and 109 perform a double function since they also function as discharge tubes for a capacitor 116 across which a sawtooth wave appears. Capacitor 116 is charged at a comparatively slow rate through the anode resistor 111 and is discharged rapidly through tubes 108 and 109 alternately to produce sawtooth waves. The repetition rate of the sawtooth wave is double that of the square wave from clipper 78 and of the sawtooth wave from the shaper 89.

The sawtooth wave from capacitor 116 is applied to a cathode follower tube 117 through a direct-current coupling circuit which may be the same as the coupling circuit used in the shaper 89. The output of tube 117 is applied to an output lead 118.

The sawtooth output of tube 117 is also applied to the clipping circuit 85 to obtain a square wave that is applied to the multiplier and shaper unit 88. The unit 88 multiplies by two and may be the same as the multiplier and shaper unit 87.

The fundamental sawtooth frequencies that may be obtained at the output terminal of the octaver are tabulated below together with the corresponding fork source code and the octaver code. Also the corresponding note is given, together with the octave in organ terminology (based on the length of the organ pipe) and with the piano keyboard numbers of the notes.

| Synthesizer Code | | Frequency | Note | Keyboard Number |
|---|---|---|---|---|
| Forks | Octaver | | | |
| 1 | 1 | 23.124 | $F\#_4$ | |
| 2 | 1 | 24.499 | $G_4$ | |
| 3 | 1 | 25.956 | $G\#_4$ | |
| 4 | 1 | 27.500 | $A_4$ | 1 |
| 5 | 1 | 29.135 | $A\#_4$ | 2 |
| 6 | 1 | 30.868 | $B_4$ | 3 |
| 7 | 1 | 32.703 | $C_3$ | 4 |
| 8 | 1 | 34.648 | $C\#_3$ | 5 |
| 9 | 1 | 36.708 | $D_3$ | 6 |
| 10 | 1 | 38.891 | $D\#_3$ | 7 |
| 11 | 1 | 41.203 | $E_3$ | 8 |
| 12 | 1 | 43.654 | $F_3$ | 9 |
| 1 | 2 | 46.249 | $F\#_3$ | 10 |
| 2 | 2 | 48.999 | $G_3$ | 11 |
| 3 | 2 | 51.913 | $G\#_3$ | 12 |
| 4 | 2 | 55.000 | $A_3$ | 13 |
| 5 | 2 | 58.270 | $A\#_3$ | 14 |
| 6 | 2 | 61.735 | $B_3$ | 15 |
| 7 | 2 | 65.406 | $C_2$ | 16 |
| 8 | 2 | 69.296 | $C\#_2$ | 17 |
| 9 | 2 | 73.416 | $D_2$ | 18 |
| 10 | 2 | 77.782 | $D\#_2$ | 19 |
| 11 | 2 | 82.407 | $E_2$ | 20 |
| 12 | 2 | 87.307 | $F_2$ | 21 |
| 1 | 3 | 92.499 | $F\#_2$ | 22 |
| 2 | 3 | 97.999 | $G_2$ | 23 |
| 3 | 3 | 103.826 | $G\#_2$ | 24 |
| 4 | 3 | 110.000 | $A_2$ | 25 |
| 5 | 3 | 116.541 | $A\#_2$ | 26 |
| 6 | 3 | 123.471 | $B_2$ | 27 |
| 7 | 3 | 130.813 | $C_1$ | 28 |
| 8 | 3 | 138.591 | $C\#_1$ | 29 |
| 9 | 3 | 146.832 | $D_1$ | 30 |
| 10 | 3 | 155.563 | $D\#_1$ | 31 |
| 11 | 3 | 164.814 | $E_1$ | 32 |
| 12 | 3 | 174.614 | $F_1$ | 33 |
| 1 | 4 | 184.997 | $F\#_1$ | 34 |
| 2 | 4 | 195.998 | $G_1$ | 35 |
| 3 | 4 | 207.652 | $G\#_1$ | 36 |
| 4 | 4 | 220.000 | $A_1$ | 37 |
| 5 | 4 | 233.082 | $A\#_1$ | 38 |
| 6 | 4 | 246.942 | $B_1$ | 39 |
| 7 | 4 | 261.626 | $C$ | 40 |
| 8 | 4 | 277.183 | $C\#$ | 41 |
| 9 | 4 | 293.665 | $D$ | 42 |
| 10 | 4 | 311.127 | $D\#$ | 43 |
| 11 | 4 | 329.628 | $E$ | 44 |
| 12 | 4 | 349.228 | $F$ | 45 |

| Synthesizer Code | | Frequency | Note | Keyboard Number |
|---|---|---|---|---|
| Forks | Octaver | | | |
| 1 | 5 | 369.994 | F# | 46 |
| 2 | 5 | 391.995 | G | 47 |
| 3 | 5 | 415.305 | G# | 48 |
| 4 | 5 | 440.000 | A | 49 |
| 5 | 5 | 466.164 | A# | 50 |
| 6 | 5 | 493.883 | B | 51 |
| 7 | 5 | 523.251 | C' | 52 |
| 8 | 5 | 554.365 | C#' | 53 |
| 9 | 5 | 587.330 | D' | 54 |
| 10 | 5 | 622.254 | D#' | 55 |
| 11 | 5 | 659.255 | E' | 56 |
| 12 | 5 | 698.456 | F' | 57 |
| 1 | 6 | 739.989 | F#' | 58 |
| 2 | 6 | 783.991 | G' | 59 |
| 3 | 6 | 830.609 | G#' | 60 |
| 4 | 6 | 880.000 | A' | 61 |
| 5 | 6 | 932.328 | A#' | 62 |
| 6 | 6 | 987.767 | B' | 63 |
| 7 | 6 | 1046.502 | C² | 64 |
| 8 | 6 | 1108.731 | C#² | 65 |
| 9 | 6 | 1174.659 | D² | 66 |
| 10 | 6 | 1244.508 | D#² | 67 |
| 11 | 6 | 1318.510 | E² | 68 |
| 12 | 6 | 1396.913 | F² | 69 |
| 1 | 7 | 1479.978 | F#² | 70 |
| 2 | 7 | 1567.982 | G² | 71 |
| 3 | 7 | 1661.219 | G#² | 72 |
| 4 | 7 | 1760.000 | A² | 73 |
| 5 | 7 | 1864.655 | A#² | 74 |
| 6 | 7 | 1975.533 | B² | 75 |
| 7 | 7 | 2093.005 | C³ | 76 |
| 8 | 7 | 2217.461 | C#³ | 77 |
| 9 | 7 | 2349.318 | D³ | 78 |
| 10 | 7 | 2489.016 | D#³ | 79 |
| 11 | 7 | 2637.021 | E³ | 80 |
| 12 | 7 | 2793.826 | F³ | 81 |
| 1 | 8 | 2959.955 | F#³ | 82 |
| 2 | 8 | 3135.964 | G³ | 83 |
| 3 | 8 | 3322.438 | G#³ | 84 |
| 4 | 8 | 3520.000 | A³ | 85 |
| 5 | 8 | 3729.310 | A#³ | 86 |
| 6 | 8 | 3951.066 | B³ | 87 |
| 7 | 8 | 4186.009 | C⁴ | 88 |
| 8 | 8 | 4434.924 | C#⁴ | |
| 9 | 8 | 4698.636 | D⁴ | |
| 10 | 8 | 4978.032 | D#⁴ | |
| 11 | 8 | 5274.040 | E⁴ | |
| 12 | 8 | 5587.652 | F⁴ | |

*Envelope shaper and keyer*

The envelope shaper and keyer unit, shown at 121, controls the rise, the duration, and the decay of the note or signal passed through the synthesizer channel. It performs a double function; it shapes the signal envelope, and it opens and closes the synthesizer channel.

The output of the octaver relay tree 97 may be supplied directly to an envelope shaper and keyer unit 121, or it may be supplied to said unit through a frequency glider or portamento unit 122 by means of a double-pole double-throw switch 123 when the switch is in the "up" position. See Fig. 1. The portamento unit and its use will be described later. When the switch 123 is in the "down" position there is a direct connection from the octaver relay tree into the envelope shaper and keyer unit. This is the connection assumed in Figs. 2a and 2b.

It will be noted that the switch 123 may be opened and a switch 124 closed so as to supply the output of the hiss generator 77 to the envelope shaper and keyer 121 instead of the output of the octaver.

The envelope shaper and keyer 121 will now be described with reference to Figs. 1, 2b, and 6. As shown in Figs. 1 and 2b, the shaper and keyer unit 121 is controlled by a relay tree 126 which is the same as the relay tree 97. In the particular example shown, the relay tree 126 is controlled from the brushes 12, 13, and 14 in association with a three-hole code in the paper roll.

The shaper and keyer unit 121 comprises an amplifier 127 and associated biasing or unblocking circuits under control of the coded paper roll. Such biasing circuits are shown in simplified form in Fig. 2b and in more detail in Fig. 6.

The amplifier 127 is normally blocked by holding it biased beyond cut-off so that no signal passes through the synthesizer channel until an unblocking signal is applied to the amplifier. The shape of this unblocking signal is determined by the particular bias network selected by the relay tree 126. Furthermore, the shape of the signal envelope is determined by the shape of the unblocking signal.

It may be mentioned at this point that in the preferred operation of the synthesizer the paper roll is coded so that all units of the synthesizer channel are set up before the amplifier 127 is unblocked. In this way the appearance of relay clicks, et cetera, in the final output is avoided. This will be discussed later in more detail in connection with the description of the double synthesizer channel operation.

In Fig. 2b there is shown a simplified unblocking circuit that has four shaping circuits under the control of the coded paper roll. The unblocking circuit comprises a capacitor 128 that has a battery 129 connected across it by way of a resistor 131 so that it is charged to the battery voltage. The negative side of the capacitor 128 is connected to the amplifier control grids (Fig. 6). The negative voltage across capacitor 128 is sufficient to block the amplifier so long as the capacitor is at full battery voltage.

The amplifier 127 is unblocked in response to paper roll coding by connecting a selected discharge circuit across capacitor 128. In Fig. 2b four different discharge circuits are shown as follows: a circuit from the upper terminal of capacitor 128 through a substantial portion of resistor 131, a lead 132, the relay tree 126 and a lead 133 back to the lower terminal of capacitor 128; a circuit from capacitor 128 through a smaller portion of resistor 131, a lead 134, the relay tree 126 and the lead 133 back to capacitor 128; a circuit from capacitor 128 through a still smaller portion of resistor 131, a lead 136, the relay tree 126 and the lead 133 back to capacitor 128; and a circuit from capacitor 128 through a resistor capacitor network 137, a lead 138, the relay tree 126 and the lead 133 back to capacitor 128.

It will be noted that the number (0) input of relay tree 126 is not connected to any capacitor discharge circuit. Therefore, when the paper roll presents no code holes to the brushes 12, 13, and 14, the capacitor 128 is at full charge and amplifier 127 is blocked.

In Fig. 2b (and in Fig. 6) the leads 132, 134, et cetera are shown connected or indicated as connected to certain specific relay input terminals. These connections are discussed later under the heading Shaper and Keyer Relay Sequencing.

In Fig. 2b the condition is illustrated where the coding calls for relay input number (3). Note that the first and second control contacts (brushes 12 and 13) are making contact through code holes in the paper. Thus the binary count is 1 plus 2 equals 3, and the number (3) relay input is connected through to the relay output as shown. In the example shown, since the lead 134 is connected to the input terminal number (3), the two right-hand sections of resistor 131 (as shown in Fig. 2b) are connected across capacitor 128. Thus the capacitor is discharged at an intermediate rate. It is discharged more slowly if the coding calls for relay input number (1) and more rapidly if it calls for input number (5).

From the foregoing it will be seen that the synthesizer channel is blocked, due to amplifier 127 being blocked, until code holes appear under one or more of the brushes 12, 13, and 14. When a punched code appears under these brushes a selected discharge circuit is connected across capacitor 128 and it begins to discharge. As it discharges, the bias on the grids of amplifier 127 (Fig. 6) becomes less negative, amplifier 127 unblocks and its gain rises to a maximum value which is reached when capacitor 128 is fully discharged.

When the punched code leaves the brushes 12, 13, and 14, the number (0) relay input is called for and there is no longer a discharge circuit connected across capacitor 128. Therefore, capacitor 128 begins to charge and continues to charge until it reaches the full voltage of battery 129. At some point before full charge is reached the amplifier 127 is biased beyond cut-off and blocked.

The discharge network 137 may be employed for synthesizing the music of a percussive instrument such as a piano. This will be discussed in connection with the following description of Fig. 6.

Fig. 6 shows, by way of example, one suitable circuit for the amplifier 127. It comprises a pair of vacuum tubes 141 and 142 which may be of the pentode type connected in push-pull relation. Input signal to the amplifier is applied through a polarity reversing tube 143 to the third grid of tube 141. Input signal is applied through a lead 144 to the third grid of tube 142.

The gain of tubes 141 and 142 is controlled by applying the negative bias voltage of capacitor 128 through a lead 146 to the first grids of said tubes. The pentodes 141 and 142 have the characteristic that their gain varies as the logarithm of the bias applied to their first grids.

It will be understood that input signal and bias connections other than those illustrated may be employed. For example, the input signal may be applied to the first grid of each pentode and the bias voltage applied to the third grid of each pentode. Or, the suppressor grid may be connected to the cathode to function as a suppressor grid, and both the input signal and the bias voltage applied to the control grid as is well known in the art.

Instead of pentodes, it may be preferred to use a pentagrid converter tube such as the 6BE6. In that case the bias voltage may be applied to the first grid and the input signal applied to the third grid.

These remarks concerning pentode and pentagrid converter connections apply also to the circuits of Figs. 7, 7a, 7b and 17.

Referring now to the bias control circuit comprising capacitor 128, it is basically the same circuit as shown in Fig. 2b. The main difference in the two circuits is that two diodes 147 and 148 have been provided for linearizing the rise and fall of the bias voltage. Before discussing this, certain circuit details will be noted. Specific voltages will be referred to, by way of example, to simplify the description.

In Fig. 6 the battery 129 is not shown; instead, a suitable direct current source is indicated by +250 volts and —105 volts marked at opposite ends of a potentiometer comprising resistors 151, 152, 153, 154, and 156 in series. The junction point of resistors 152 and 153 is grounded.

The lower terminal of capacitor 128 is connected through a variable tap to a point on resistor 154 that is at plus 20 volts. The upper terminal of capacitor 128 is connected through the resistor 131 and a variable resistor 157 to the minus 105 end of the potentiometer. Thus capacitor 128 will charge in the direction to block amplifier 127. The rate of charge may be changed by adjusting the resistor 157.

The discharge circuits are the same as previously described. However, two additional discharge circuits are shown, one being connected by a lead 138 to input terminal number (6) of the relay tree 126. The other added circuit comprises a resistor-capacitor network 159, similar to network 137 but with different constants, that is connected to input terminal number (4).

Additional capacitors 161 and 162 are shown with switching at 163 and 164. With this arrangement either or both of the additional capacitors may be connected in parallel with capacitor 128. This provides control over the rate of rise or growth of the amplifier unblocking pulse. It also provides control over the rate of fall or decay of the unblocking pulse, in addition to the control provided by adjusting the resistor 157.

The function of diodes 147 and 148 will now be described. Referring first to diode 148, it will be noted that this diode has its cathode connected to ground and its anode connected to the upper terminal of capacitor 128. The lower terminal of capacitor 128 is at plus 20 volts with respect to ground.

Assume that capacitor 128 is at its maximum charge of 50 volts across the capacitor (which is determined by diode 147 as explained later) and one of the discharge circuits is closed; for example, the coded paper roll causes the relay tree 126 to connect lead 132 to the output lead 133. Capacitor 128 begins to discharge, its upper terminal becomes less negative, and likewise the anode of diode 148 becomes less negative.

The original maximum charge on capacitor 128 was 50 volts, as previously stated, the lower capacitor terminal being at 20 volts above ground (plus 20) and the upper terminal being 30 volts below ground (minus 30). When the capacitor 128 discharges to 20 volts across it, its upper terminal has reached ground potential, the anode of the diode 148 is no longer negative with respect to the cathode, but instead is at cathode potential. The diode 148 begins to conduct at substantially this point in the discharge cycle, it being understood that the anode of the diode must be slightly positive with the cathode to overcome tube voltage drop.

Thus it is apparent that upon the closing of a discharge circuit the capacitor 128 discharges until its upper terminal reaches ground potential. This is the normal operating condition for amplifier tubes 141 and 142 and they are operating at full gain. It will be noted that they are provided with suitable cathode bias.

The bias voltage or unblocking pulse appearing on the lead 146 is shown by the graph 166 (see Figs. 6 and 7). It will be seen that upon closing of a discharge circuit the voltage rise is linear since the diode 148 stops the rise before it starts to fall off as it would if the charge were allowed to follow the dotted line.

As a result the build-up of the envelope of a tone or other sound at the amplifier output is logarithmic since the amplifier gain characteristic is logarithmic. Thus the rise of the output envelope is linear in decibels. Studies have shown that this is desirable although it, of course, is not essential.

Another reason for desiring a linear rise or growth in the unblocking signal 166 is that an analysis indicates that the least disturbance or noise is introduced in changing from one amplitude level to another if the change is linear.

Refer now to diode 147 which limits the maximum charge across capacitor 128. Its cathode is connected to the upper terminal of capacitor 128 and its anode is connected through an adjustable tap to a point on resistor 152 that is at minus 30 volts with respect to ground.

Assume now that the amplifier 127, which has been unblocked for a certain period to pass a note or sound, is to be blocked to terminate the note or sound. Such blocking of the amplifier is effected as a result of the punched code under brushes 12, 13, and 14 (Fig. 2b) terminating, thus opening whatever discharge circuit was being held closed.

As a result the capacitor 128 begins to charge through resistors 131 and 157. It will be noted that the rate of charge may be adjusted by adjusting the value of resistor 157. As capacitor 128 charges, its upper terminal becomes more negative, and it becomes negative enough to block the amplifier 127.

Diode 147 limits the maximum charge because as soon as the upper terminal of capacitor 128 goes to minus 30 volts with respect to ground (i. e., when there is 50 volts across capacitor 128), the cathode of diode 147 is no longer positive with respect to its anode and diode 147 begins to conduct, thus preventing further charging of the capacitor. Again it will be understood that actually the cathode of the diode must be slightly negative with respect to its anode, i. e., negative by the amount of the diode voltage drop, before diode current flows. Thus the voltage on lead 146 falls back to the value of 30 volts below ground potential.

Here again, as shown by the falling portion of the graph 166, the change in voltage is substantially linear due to the diode action. Specifically, capacitor 128 is prevented from continuing its charge until the charging curve becomes non-linear.

The advantages of a linear fall or decay of the unblocking signal 166 are the same as those discussed with reference to the linear rise or growth of said signal.

From the foregoing description it will be apparent that an envelope shaping and keying pulse similar to the graph 166 is produced in response to closing and then opening the discharge circuits that are connected to relay input terminals (1), (3), (5), and (7). The rate of rise or growth of the pulse 166 is determined by which discharge circuit is selected.

Two other discharge circuits have been illustrated. One of these comprises the network 137 which is connected through a variable resistor 167 and the lead 138 to input terminal number (6) of the relay tree 126. The other discharge circuit comprises the network 159 which is connected through a variable resistor 168 and a lead 169 to relay input terminal number (4).

Refer now to the operation of the discharge circuit comprising the network 137, for example. When this discharge circuit is closed, the capacitor 128 suddenly discharges into the capacitor of network 137 to produce a steeply rising pulse as shown by graph 171 in Fig. 6a. The charge thus produced on the capacitor of network 137 leaks off through the shunting resistor. By adjusting the value of resistor 167 the steepness and shape of the pulse rise may be adjusted as shown, for example, by graph 172 in Fig. 6a. In the specific example assumed, resistor 167 is adjusted to produce the pulse shown by graph 171.

The keying pulse shown by graph 171 is obtained by setting the value of resistor 167 substantially to zero. The result of applying such a keying pulse to amplifier 127 is to obtain a sound like that obtained by striking a piece of wood, as in the case of a xylophone.

The keying pulse shown by the graph 172 is obtained by including a substantial portion of resistor 167 in the discharge circuit. This results in a sound like that of a piano, for example. This particular pulse might rise to maximum value in from 10 to 20 milliseconds, for example, with possibly from six to twelve sawtooth cycles occurring during this rise time.

It may be desired to code the paper roll to select discharge network 159 with its larger size capacitor, particularly if one or both of capacitors 161 and 162 have been put in parallel with capacitor 128. In the example assumed, the resistor 168 in series with network 159 is adjusted so that the unblocking pulse produced by this circuit is similar to the pulse shown by the graph 172.

In Fig. 6 the values of certain circuit elements have been indicated in thousands of ohms, megohms and microfarads merely by way of example.

As indicated by the dotted lines in graph 166, it may be desirable in some cases to have a non-linear rise or fall, or both, of the keying pulse. This result may be obtained by omitting one or both of the diodes (147 and 148), or by re-adjusting the voltages applied to them.

From the foregoing description it will be evident that the signal passed by the amplifier 127 may be given an envelope shape such as to produce any desired sound effect.

It should be understood that the envelope shaping and keying circuit may be designed in various ways. For example, Fig. 6b shows a shaping and keying circuit in which the amplifier 127 is unblocked in response to the charging of a capacitor C. Here the switches S1, S2, S3, and S4 represent the connections that may be made through the relay tree 126.

The capacitor C is connected across resistors R1, R2, R3, and R4 in series. The negative side of the battery 129 is connected through a resistor R7 to one side of the capacitor C. The positive side of the battery is grounded and may be connected to the other side of the capacitor C through one of the switches S1, S2, S3, and S4 as selected by the paper roll coding.

In operation, if switch S1 is closed the capacitor C is charged through a circuit including resistors R2, R3, and R4. Thus the unblocking pulse appearing on lead 146 rises comparatively slowly in the positive direction. If, instead, switch S3 is closed, resistors R2 and R3 are not included in the charging circuit and the rise time of the unblocking pulse is shorter. In any case, when a switch such as S1 is opened to terminate the sounding of a tone, the capacitor C discharges through R1, R2, R3, and R4 to bring it back to its original condition.

A piano or other percussion effect may be obtained by closing the relay tree circuit represented by the switch S4. This closes a charging circuit that includes a capacitor C1 and resistor R6 in parallel with each other and in series with a resistor R5. The operation of this circuit is as follows:

When switch S4 is first closed, the resistor R7, capacitor C, resistor R5 and capacitor C1 are the effective elements connected across the battery 129. They function as a voltage divider circuit, the lead 146 being connected to an intermediate point on said divider. In this example it is assumed that capacitors C and C1 are of the same value.

After the capacitors C and C1 have reached full charge, the effective voltage divider elements are resistors R7, R1, R2, R3, R4, R5, and R6. In the example assumed, the sum of resistors R1, R2, R3, and R4 is a resistance greater than that of resistor R6. Thus the voltage divider action now supplies less voltage to the lead 146 than when switch S4 was first closed. It is apparent that the desired percussion type unblocking pulse is obtained.

*Master volume control*

Referring again to Figs. 1 and 2b, the output of the envelope shaper and keyer 121, specifically the output of amplifier 127, is fed to a master volume control unit 173 which is controlled by a relay tree 174. The relay tree 174 is the same as relay tree 71 and is controlled by contact points or brushes 15, 16, 17 and 18 associated with the coded paper roll.

In the example illustrated, the volume control unit 173 comprises a gain control resistor 176 having tapped points connected to the several relay input terminal numbers (0) to (15) as indicated.

In this example, the fourth contact point of the group 15, 16, 17, and 18 is over a code hole in the paper roll so as to call for connecting relay input terminal number (8) on through to the relay output lead 177. Each note played by the synthesizer can be played at any volume within the synthesizer range by properly coding the portion of the paper roll that is moved under contacts 15 to 18.

Fig. 7 shows a master volume control arrangement, including an amplifier 178, that may be employed in place of the units 173 and 174 of Fig. 2b. The amplifier 178 may be a push-pull amplifier of conventional design comprising pentodes 179 and 181. Signal from the envelope shaper and keyer passed through amplifier 178 to the spectrum controller.

The amplifier gain is varied by varying the bias voltage on the first grids of the vacuum tubes 179 and 181. The bias voltage is applied from a tapped potentiometer resistor 182 through a relay tree 183 and a variable resistor 184 to said first grids. Relay tree 183 is the same as relay tree 71.

If the coding on the paper roll is as shown in Fig. 2b, the relay input terminal number (8) will be connected through to the relay output terminal and the resistor 184. Thus the amplifier gain will be at some intermediate value.

It may be noted that an overall gain adjustment may be made by means of a variable resistor 186 which is connected in series with the battery or other D.-C. source 187. The source 187 provides the desired voltage drop across the potentiometer resistor 182.

An important feature of the circuit of Fig. 7 is the provision of a capacitor 188 connected between the grid side of resistor 184 and ground. Because of the time constant of the circuit comprising capacitor 188 and resistor 184, the change in the gain of amplifier 178 is always gradual when the record coding causes the relay tree 183 to switch to a different tap on the potentiometer 182. The time constant may be adjusted by changing the value of resistor 184.

In Fig. 7 the values of certain circuit elements have been indicated, by way of example, in ohms, megohms, and microfarads. It will be noted that resistor 184 has a much higher resistance than resistor 182 so that the time constant of the circuit is not changed much by the switching from one tap to another of resistor 182.

The use of the volume control circuit of Fig. 7 eliminates the switching transients and ambiguities in the relay tree 183 during the actuation cycle. One advantage of this is that it makes it possible to change the volume of a tone during the sounding of the tone.

It should be noted that the master volume control circuit of Fig. 2b is usually satisfactory so far as relay switching transients and ambiguities are concerned because, as discussed hereinafter in connection with double channel operation, the volume control circuit is set up by the coding before the envelope shaper and keyer amplifier is unblocked to pass signal. Therefore, the relay tree is given the required short time for settling down to the proper connections to avoid momentary ambiguities.

Spectrum controller and volume equalizer units

As shown in Figs. 1 and 2b, the output of the master volume control relay tree 174 is passed through a signal spectrum controller unit 191 which is largely for the purpose of determining the harmonic content of the tone. This is the unit that determines to a great extent whether a tone sounds like that of a violin or like that of a trumpet, for example.

In Fig. 1 there is shown a vibrato unit 192 that may be connected in cascade with the spectrum controller 191 by means of a double-pole double-throw switch 193. Normally this would be connected in if violin music, for example, were being played. The vibrato unit 192 will be discussed later. In Fig. 2b it is assumed that the switch 193 is in the down position so as not to include the vibrato unit in the channel.

The spectrum controller unit 191 comprises filters and networks of various types that may be selectively connected into the synthesizer channel by suitable means such as switches or cord connections.

In Fig. 2b the unit 191 is shown as comprising, by way of example, high and low pass filters, resonator filters and compensator networks. In the example illustrated, a high pass filter, two resonator networks, and a compensating network are all connected in series by means of cord connections. Through this series combination the output of the master volume control unit is fed to the input terminal number (0) of a volume equalizer unit 194. Said output is also connected through cord connections and spectrum controller networks to the input terminal number (1) of the equalizer unit 194.

The volume equalizer unit 194 preferably comprises an individual vacuum tube amplifier for each equalizer input terminal as schematically indicated. Each amplifier output circuit connects to an input terminal of a relay tree 196 which is the same as relay tree 71.

The output volume of each amplifier of unit 194 is individually adjustable. In this way any change in volume caused by the insertion of a different filter or network in the spectrum controller may be compensated. Thus in the example illustrated the volumes of the signals at inputs (0) and (1) at the equalizer are unlike because of the different networks inserted. The input signals applied to the grids of the amplifier tubes of unit 194 are adjusted so that the two signals are of like volume at the input terminals numbers (0) and (1) of the relay tree 196. This, of course, is done while the master volume control unit 173 is being held at some particular volume control setting.

The above process of equalizing volume is not essential but it is very useful in practice because it simplifies the coding for the master volume control unit. With the volume equalized as described, the volume of the synthesizer channel output (the output of relay tree 196) is a definite function of the punched code actuating the master volume control unit.

The relay tree 196 is controlled by contact points or brushes 8, 9, 10, and 11 associated with the coded paper roll. By punching the proper code to be passed under brushes 8, 9, 10, and 11, any spectrum controller network combination that has been set up may be selected and connected in cascade with the rest of the synthesizer channel. In the example shown, there are no holes under brushes 8, 9, 10, and 11 so that the input terminal number (0) of relay tree 196 is connected through to the relay output terminal.

The output of relay tree 196 may be connected through an isolating resistor 197 to a recording equalizer network in the event a record is to be cut, or to an audio frequency amplifier 198 and loud speaker 199 in the event the music is to be heard directly from the synthesizer.

It should be pointed out that in our synthesizer the spectrum of a tone may be changed while sounding the tone. This is important for synthesizing some sounds. If the tone spectrum is to be changed while the tone is being sounded, it may be preferred to make the relay tree 196 of the vacuum tube relay type, such as previously described, rather than of the mechanical relay type. The mechanical relay type may be used but the change from one spectrum to another will be abrupt and may introduce a click or ping. The vacuum tube type relay, if substituted for relay tree 196 can be adjusted to give a more gradual change from one spectrum to another by proper selection of the filter elements including the capacitor 90 (Fig. 4b).

Spectrum controller details

The spectrum controller filters and networks and the effects of the various filters will now be discussed in more detail.

Figure 9:
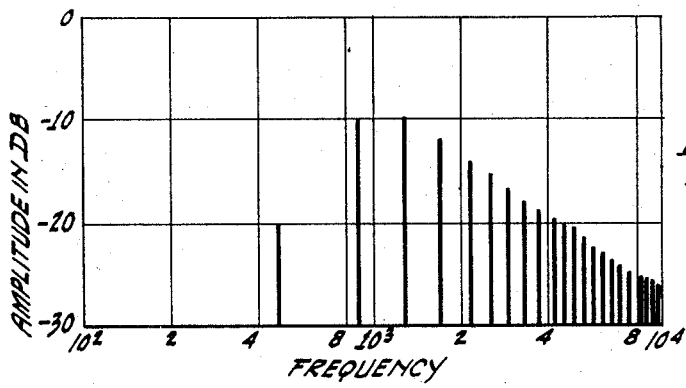
Figs. 9 and 10 are diagrams showing the effect of high pass and low pass filters, respectively, on the spectrum of a sawtooth wave.
Figure 10:
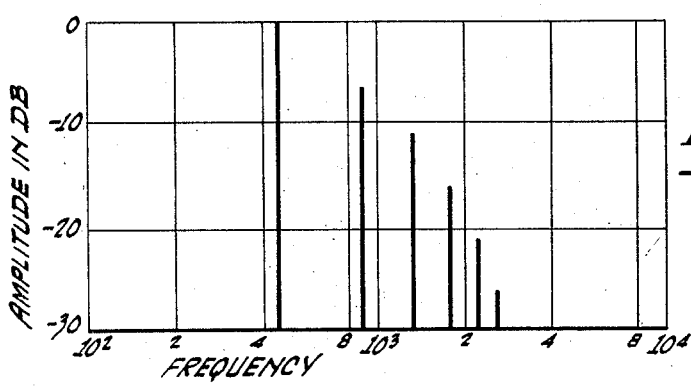

The high-pass and low-pass filters preferably are adjustable for adjusting their frequency cut-off points. The effects of these filters will be seen by referring to Figs. 8, 9, and 10. Fig. 8 shows the frequency spectrum of a sawtooth wave having a fundamental frequency of 440 cycles per second. Fig. 9 shows the result of passing this sawtooth wave through a high-pass filter having a certain low frequency cut-off. In this case the fundamental frequency is present but is greatly attenuated. Fig. 10 shows the result of passing the same sawtooth wave through a low-pass filter having a certain high frequency cut-off. In this case the highest frequency harmonics have been eliminated.

Figure 11:
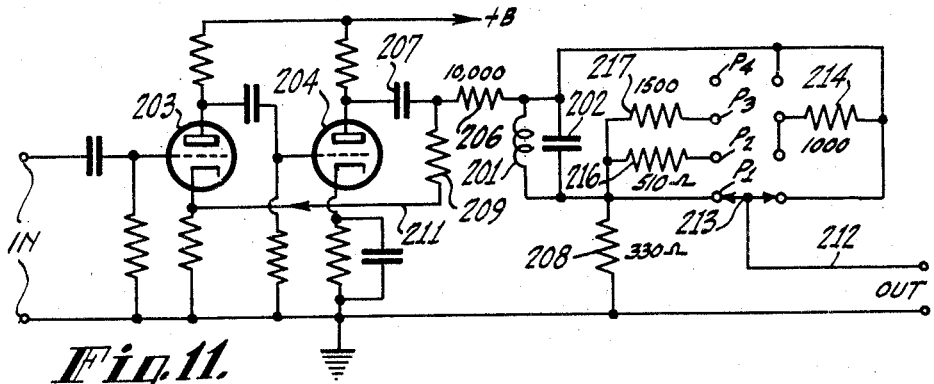
Fig. 11 is a circuit diagram of a resonator filter circuit of the type that may be used in the spectrum controller of Figs. 1 and 2b.

Referring now to the resonator filters, these preferably are designed as shown in Fig. 11 although they may be in the form shown in Fig. 2b. Each resonator filter is tuned to a different frequency so that different filters affect different harmonics of the sawtooth wave. Eight resonator filters may be provided, for example, and they may be used individually, some or all of them cascaded, or used in any desired combination. When cascaded, the higher frequency resonators preferably should precede the lower frequency resonators to avoid accentuating harmonic distortion. These eight resonator filters may be designed to resonate at the following frequencies in cycles per second, respectively, 2637; 1760; 1174.6; 783.9; 523.2; 349.2; 233.08; and 155.5.

Referring to Fig. 11, the resonator filter comprises a parallel resonant circuit comprising an inductance coil 201 and a capacitor 202. This circuit is tuned to one of the above-mentioned frequencies, such as 2637 cycles per second.

Signal is applied to the resonant circuit 201, 202 through a two stage amplifier comprising vacuum tubes 203 and 204. It will be noted that the resonant circuit 201, 202 is connected between the anode of tube 204 and ground or reference potential. The upper end of circuit 201, 202 is connected to said anode through a resistor 206 and a coupling capacitor 207. The lower end of circuit 201, 202 is connected to ground through a resistor 208.

Negative feedback is provided in the two stage amplifier so that the voltage output of the second tube will be practically independent of the impedance of the load. This feedback is introduced by a connection from the output side of coupling capacitor 207 through a lead 211 to the cathode of the tube 203.

The output lead 212 of the resonator filter is connected to switch blades 213 which may be moved upward (in the diagram shown) to three other positions. The four switch positions illustrated are identified as positions P1, P2, P3, and P4.

With switch 213 in position P1, the resonant circuit 201, 202 is shorted and the unit acts as a flat amplifier over the entire frequency range.

In switch position P2 the output lead 212 is connected to the junction point of two resistors 214 and 216 which are now connected in series across resonant circuit 201, 202.

In switch position P3 the output lead 212 is connected to the junction point of the resistor 214 and a resistor 217, these two resistors now being connected in series across resonant circuit 201, 202.

In switch position P4 the output lead 212 is connected to the upper end of resonant circuit 201, 202. At this switch position the resonant circuit has maximum Q since there are no resistors connected across it.

In Fig. 11 the values in ohms of certain resistors are given merely by way of example.

Figure 12:
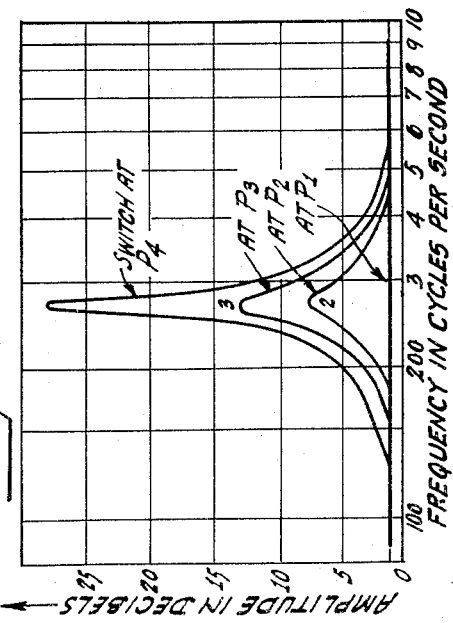
Fig. 12 is a group of graphs showing frequency response characteristics of a resonant filter for different adjustments.

The switching and resistor ararngement of Fig. 11 gives a family of resonant curves such as shown in Fig. 12 for the different switch positions. It will be seen that at position P4 the resonant curve is of maximum amplitude and sharpness. At position P3 the curve has been broadened by lowering the Q of the circuit; also the curve is of smaller amplitude both because of the lowered Q and because of tapping down on the damping resistors 214 and 217. Note that the result is to make curve of position P3 fall within and follow along the curve of position P4.

At switch position P2 the resonant curve has been broadened and reduced in amplitude still further as a result of shunting a lower resistance combination of resistors across the resonant circuit, and also as a result of tapping down still further on the shunting resistance combination. Again it will be noted that this resonant curve falls within and follows along the other resonant curves. It is believed that this combination of increasing the Q of the resonant circuit and also tapping down to obtain curves as illustrated in Fig. 12 is a very desirable one for use in a spectrum controller unit. It gives good filter characteristics for modifying the frequency spectrum of a sawtooth wave. It also reduces the number of switches required as compared with an arrangement where different resistors are switched in to vary the Q and where separate switches are provided for tapping down at different points on the resistors.

Figure 13:
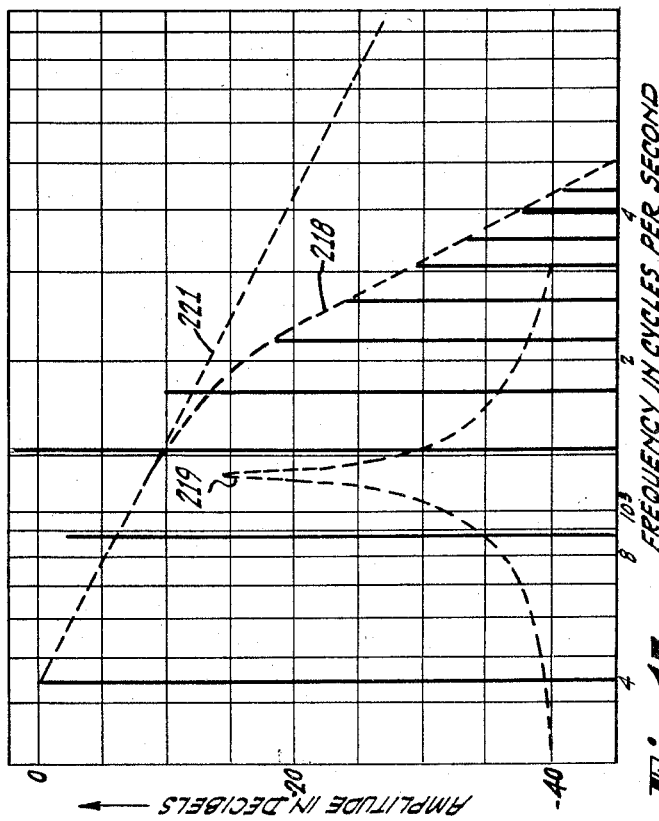
Fig. 13 is a diagram showing the effects on a sawtooth spectrum of a sample filter combination in the spectrum controller.

Fig. 13 shows the effect of a simple filter combination on the frequency spectrum of a sawtooth having a fundamental frequency of 440 cycles per second. In this instance a low pass filter and a single resonator filter are cascaded in the spectrum controller. The low pass filter has a cut-off at about 1800 cycles as indicated by the broken line 218. The frequency characteristic of the resonator filter is indicated by the broken line graph 219. This particular resonator filter is the one that is resonant at 1174.6 cycles. The broken line 221 shows the amplitude that the various frequency components of the sawtooth wave would have in the absence of any filtering.

Inspection of Fig. 13 will show that the effect of the filter combination has been to increase the amplitude of the harmonic components in the region of the resonant frequency of the resonator filter, to attenuate some of the higher frequency components, and to eliminate entirely the still higher frequency components. It will be apparent that the sawtooth frequency spectrum may be peaked at a plurality of points in the spectrum as desired.

The compensator networks are provided for attenuating high frequency or low frequency components, or both. They may be simple networks such as shown in Fig. 2b. Preferably, they are included in the input circuit of a cathode follower tube.

Figure 14:
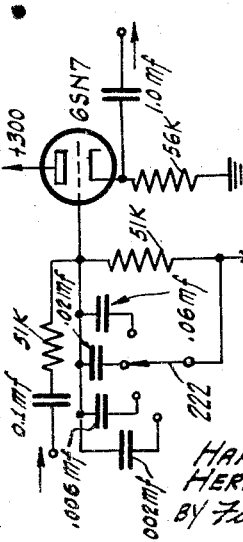
Fig. 14 is a circuit diagram of a compensator network that may be used in the spectrum controller.

Fig. 14 shows an example of a compensator circuit for losing high frequency components. The tube type, the voltages and the values of the circuit elements are indicated by way of example. Resistance and capacity are indicated in thousands of ohms and in microfarads. A cathode follower circuit is shown. Since the cathode operates positive with respect to ground, a positive voltage of the correct value is applied to the grid to give it the proper negative operating bias with respect to the cathode.

By means of switch 222 any one of four capacitors may be selected so as to attenuate highs different selected amounts.

A compensator circuit that is to lose low frequency components may comprise a cathode follower tube that has a differentiating type circuit in its input circuit for applying signal to the tube grid.

The spectrum controller may include, for example, six or more compensator circuits of the type above described, each designed to give a different kind or degree of accentuation, discrimination or attenuation in the signal spectrum.

*The double synthesizer channel and sequencing*

As previously stated it is desirable to employ two synthesizer channels so that the coded paper record can set up one channel while the other channel is in operation and producing a tone; also, so that one channel can start playing a tone before the other channel stops playing a tone.

Fig. 1 shows a second channel which is a duplicate of the one previously described. Everything is duplicated except the frequency sources of block 50. As indicated in Fig. 3, each tuning fork output is connected to an input terminal of the relay tree 71 of the first channel and also to the corresponding input terminal of a relay tree 71A of the second channel.

The second synthesizer channel comprises the frequency sources 50 common to the two channels, the relay tree 71A, an octaver 72A, a relay tree 97A, an envelope shaper and keyer 121A, a master volume control unit 173A, a relay tree 174A, a spectrum controller 191A, a volume equalizer unit 194A and a relay tree 196A. The output of the second channel is fed through an isolating resistor 223 to the output terminal. Thus the outputs of the two channels may be supplied successively or simultaneously to a record cutter or to a loudspeaker. Instead of using the isolating resistors 197 and 223, it may be preferred to employ a combining amplifier (two tubes with a common output) to which the two channel outputs are applied.

The relay trees of the second channel are controlled by contact points or brushes 19 to 36, inclusive, which are associated with the coded paper roll. The second channel is controlled by the brushes 19 to 36 in the same way that the first channel is controlled by the brushes 1 to 18.

Inspection of Fig. 1 shows that one half of the paper roll (the left side as viewed in Fig. 1) carries the punched coding for the first channel, while the other half of the roll carries the coding for the second channel.

In order to simplify the drawing, the portamento and vibrato units are not shown associated with the second channel. However, it should be understood that ordinarily if such units are connected into the first channel, corresponding units are also connected into the second channel. Likewise, if the hiss generator 77 is connected into the first channel, a similar hiss generator is similarly connected into the second channel.

Figure 15:
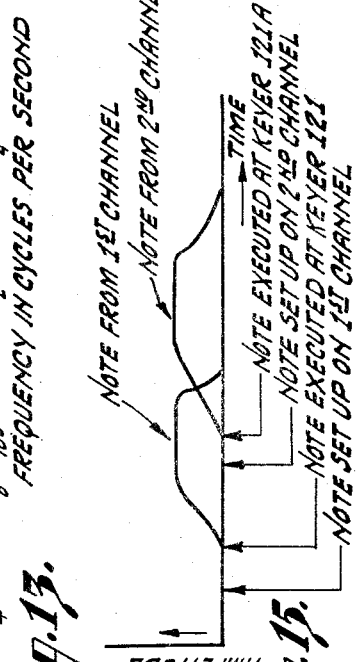
Fig. 15 is a group of graphs that are referred to in explaining the double channel operation of the synthesizer shown in Fig. 1.
Figure 22:
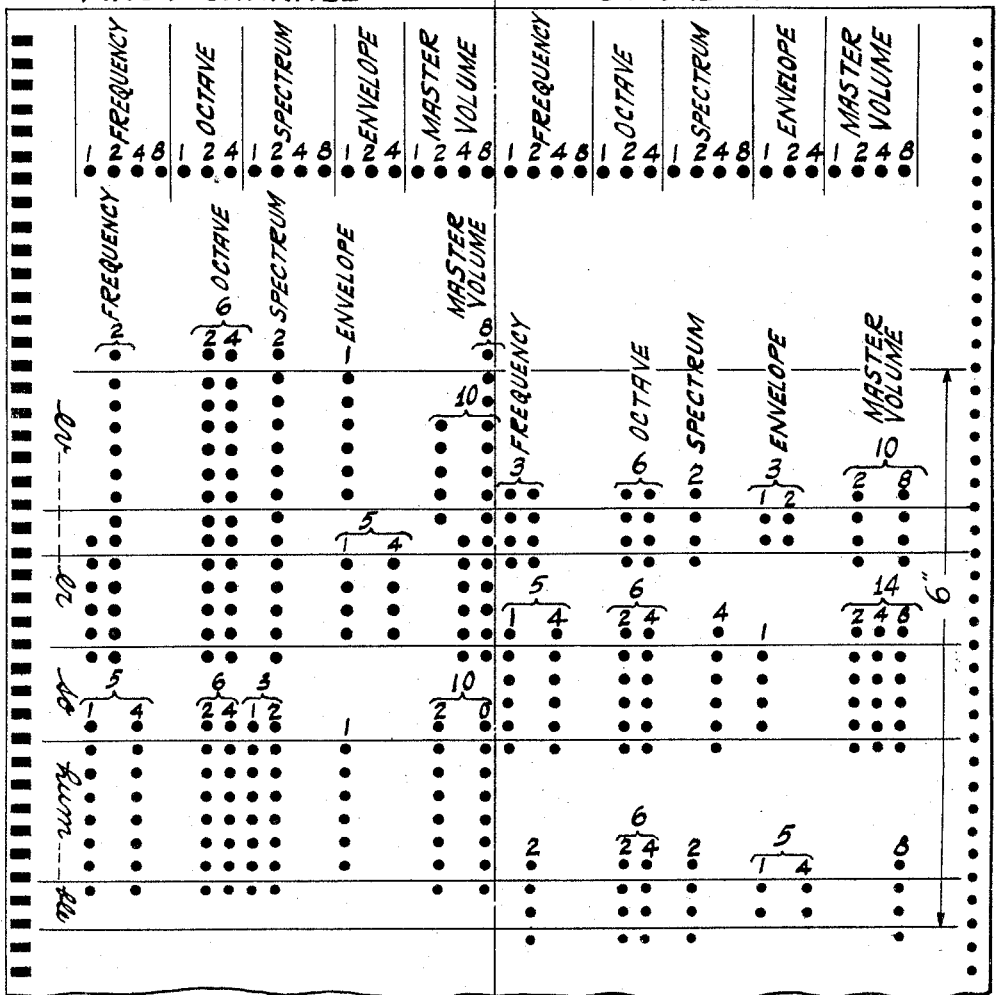
Fig. 22 is a view of a short length of a coded paper roll record that illustrates the kind of punched paper record that is used to operate the music synthesizer shown in Fig. 1.

Fig. 15 illustrates one way of operating the two channels of Fig. 1. Also refer to Fig. 22 showing a sample paper roll. The coding on the left side of the paper roll is punched so that all channel units in the first channel are set up for producing the desired note. Then the punched code for the shaping and keying amplifier follows, said amplifier is unblocked (using a selected discharge circuit), and the note appears at the channel output terminal. While this note is being produced, the coding on the right side of the paper roll moves under the associated brushes and the units in the second channel are set up for producing the desired note. A moment later the shaper and keyer actuating code moves under the associated brushes and the note is executed, i. e., the shaper and keyer amplifier is unblocked. In this way each channel plays alternate notes.

In the example of Fig. 15 the second channel note is executed while the first channel note is still being played. This is often desirable, as in the case of piano music, but it may be preferred to execute a note after the preceding note has ended.

It is apparent that two channels are required to play one note before another note has ended. However, the use of two channels is important for another reason.

By employing two channels there is always sufficient time to set up the various relay trees of a channel before it is necessary to sound the note of that channel. This is important, particularly where mechanical relays such as the relay trees are employed. One reason for this is that it cannot be expected that two relays of a relay tree will operate simultaneously. One is almost certain to operate a little ahead of the other, both because of the relay characteristics themselves and because of slight inaccuracies in the code punching. As a result, upon actuating a relay tree there may be an instant when the wrong relay input terminal is connected through to the relay output terminal. This is referred to as relay ambiguity. An instant later, however, the relay tree will be properly set up.

Thus it is evident that all relay trees in a channel should be given sufficient time, if possible, to settle down to the connection called for by the code before a tone is sounded.

Another reason for giving the mechanical relay trees time to switch to a new connection before a tone is sounded is that, even if the relays operated perfectly, relay clicks or noise would appear in the channel output if the channel were open (unblocked) when the relays operated.

The above-described scheme of setting up relays before unblocking a channel cannot, of course, be used at the envelope shaper and keyer unit since the relay tree at this unit is the one that unblocks the channel. Therefore, at this point the problem must be solved in a different way.

*Shaper and keyer relay sequencing*

At the envelope shaper and keyer unit there are no difficulties due to relay clicks since the relay contacts of the relay tree necessarily are closed before the amplifier of the unit unblocks. The difficulties at this unit due to relay ambiguities are avoided in part by the fact that some of the desired envelope shapes have a gradual rise or growth. In Fig. 6a the graph 166 illustrates an unblocking pulse that produces such an envelope shape.

The pulse of graph 166 has to rise to a certain voltage level before the amplifier 127 (Figs. 6 and 2b) is unblocked. Thus, in the case of this unblocking pulse the relay tree 126 of the shaping and keying unit is given time to complete a switching operation as called for by a code before the amplifier 127 unblocks.

It is now evident that as to discharge circuits producing unblocking pulses with a gradual rise, it does not matter if they are connected to relay input terminals that may momentarily and erroneously (due to relay ambiguity) be connected through to the relay output terminal. No undesired effect will result because the amplifier 127 will not have time to unblock before the relay tree switches to the correct relay connection.

As to the discharge circuits such as those comprising networks 137 and 159 (Figs. 6 and 2b) the situation is different. These circuits produce steeply rising unblocking pulses such as shown by graphs 171 and 172 of Fig. 6a. These circuits must not be allowed to become effective except when they are actually called for by the coding. Otherwise the amplifier 127 would be opened momentarily to produce an undesired sound such as a click or ping.

From the foregoing it is apparent that the real problem is to prevent a steep rising unblocking pulse from ever being applied to the amplifier 127 when such a pulse is not called for by the coding. In the circuit shown in Figs. 2b and 6 this problem is largely solved by connecting all slow discharge circuits to the odd number input terminals of relay tree 126 and all fast discharge circuits to the even number input terminals of the relay tree.

Now consider the operation where the first, second, and third relays of relay tree 126 are actuated by relay coils B1, B2, and B4, respectively. If the punched code in the paper roll is to call for one of the slow discharge circuits (to produce a gradual rising pulse) the first code hole that is to move under brush 12 is punched slightly ahead of the code holes (if any) punched to fall under brushes 13 and 14.

It will be noted that in the absence of any code hole under brushes 12, 13, and 14 the three relays of relay tree 126 will be "up" so that the through connection to the output terminal is from number (0) input terminal, which is not connected to any circuit.

Now when the shaping and keying code moves under brushes 12, 13, and 14, the coil B1 is energized before the coils B2 and B4 are energized. To get this result the number one code hole (for brush 12) may be punched one quarter of a code hole diameter, for example, in advance of the other two code holes or the other code hole, as the case may be. With relay coil B1 energized ahead of coils B2 and B4, the first relay armatures are pulled down to connect to the odd number input terminals while the second and third relays are still in the "up" position. It follows that the relay tree is thus prevented from erroneously and momentarily connecting an even number input (and thus a fast discharge circuit) through to the relay output terminals.

In the matter of advanced punching of the first code hole of a code group for actuating the first relay (through brush 12), it is preferred that the first code hole be repunched in its regular or normal position thus producing a slightly elongated first hole. In the example given, this gives the first code hole a length equal to one and one-quarter diameters of a code hole. The holes following said first code hole are then punched in their regular positions. As previiously pointed out, in the coding scheme illustrated, a row of punched holes used in cooperation with a brush wide enough to bridge the space between holes gives the same result as a slot in the paper having the same length as the row of holes. Therefore, the code punching with an advanced code hole as described is the same, in effect, as punching a slot and punching the start of the slot a little in advance of its normal starting point.

For the case where the coding calls for a fast discharge circuit, i. e., one connected to an even number terminal, there is no need for the advanced code punching described above. In this case there will be no code holes under brush 12 so that the first relay will always be "up" with the relay armatures connected to the even number input terminals. Thus there cannot be a momentary connection to a slow discharge circuit. As previously explained, such a momentary connection would not be detrimental if it did occur.

It has been explained how difficulties as to ambiguities between even input terminals and odd input terminals are avoided.

As to ambiguities between the odd number input terminals themselves, any possible difficulty as to this may be avoided by connecting the slower discharge circuits to the input terminals that are connected through to the output terminal by the smallest number of relays. For example, reference to Figs. 2b and 6 will show that as to the comparatively slow discharge circuits connected to the odd number relay terminals, the slowest discharge circuit is connected to input terminal number (1), the next slowest to terminal number (3) et cetera. Thus the slowest discharge circuit is connected, in the example given, to the lowest number relay terminal, and the fastest discharge circuit is connected to the highest number relay terminal. The reason for this is that in the present example, in case of relay ambiguity, the lower number input terminals are always connected through to the output terminal before the higher number input terminals are, and an unblocking pulse with a slower rise time will have little or no adverse effect on the shaping and keying action if applied momentarily in advance of a desired unblocking pulse having a faster rise time. Also, it should be noted that as to input terminal number (1) there is never any ambiguity.

The preceding paragraph may be better understood if it is noted that in Fig. 2b the relay tree 126 comprises the three relays B1, B2, and B4 that are actuated by binary code holes 1, 2, and 4. Input terminal 1 is connected through by code hole 1 actuating relay B1; input terminal 3 is connected through by code holes 1 and 2 actuating relays B1 and B2; input terminal 5 is connected through by code holes 1 and 4 actuating relays B1 and B4; and input terminal 7 is connected through by code holes 1, 2, and 4 actuating relays B1, B2, and B4. Actually there are three categories of input terminals in the example given; first, terminal 1 connected through by actuating one relay; second, terminals 3 and 5 connected through by actuating two relays; and third, terminal 7 connected through by actuating three relays. As to the order of connections discussed in the preceding paragraph, it is immaterial whether a connection is made to terminal 3 or to terminal 5.

Similarly, as to possible ambiguity between even number input terminals themselves, which control rapidly rising pulses, any adverse effect may be avoided by connecting the slowest discharge circuit to the lowest number input terminal, the next slowest discharge circuit to a higher number input terminal et cetera. The reason for this is the same as just described in connection with the comparatively slow discharge circuits connected to the odd number terminals.

In the example shown, the slower discharge network 159, 168, is connected to the relay input terminal number (4) while the faster discharge network 137, 167 is connected to the input terminal number (6).

If the only discharge circuits to be used are the slow ones connected to the odd number relay input terminals, any ambiguity as between even and odd input terminals can be avoided by throwing a switch 130 (Fig. 2b) to energize coil B1 and hold the first relay in the "down" position. The same result may be obtained by punching a continuous row of holes to move under the brush 12, but if this is done the use of the number (1) input must be given up, i. e., no discharge circuit should be connected to it.

It may be noted that for some uses of the synthesizer, the easiest way to avoid any relay ambiguity at the shaper and keyer unit 121 may be simply to disconnect all discharge circuits, except the one that is to be used. Of course, if more than one discharge circuit is to be called for by the coding, then the procedure of simply disconnecting undesired discharge circuits cannot be used.

In connection with this discussion of relay ambiguity it may be noted that the relays of the relay trees, in the particular synthesizer being described, close in from five to seven milliseconds or less upon application of energizing voltage to the relay coil. Their opening time is substantially the same as their closing time. The relays of any one relay tree, in particular, should be substantially identical as to operating times. In practice they have a tolerance within one millisecond.

*Frequency glider or portamento unit*

As previously mentioned, it may be desirable to include a frequency glider or portameno unit in the synthesizer channel. With this unit it is possible to slide from one note to another as is commonly done in playing a trombone, a violin or a steel guitar.

A frequency glider is represented in Fig. 1 by the block 122 and is shown in some detail in Fig 16. Additional details are shown in Figs. 16a 16b, and 16c.

As shown in Fig. 16, the frequency glider 122 may comprise a frequency meter 226 of the type that has a direct current output. The D.-C. output increases linearly with an increase in the fundamental frequency of the applied sawtooth wave. The D.-C. output preferably is applied through a filter 227 for controlling the rate of rise or the rise characteristics thereof to provide a D.-C. control signal.

The output of filter 227 is applied to a suitable oscillator 228 whose frequency is a function of a D.-C. control signal. The particular oscillator illustrated is of the beat frequency type comprising a variable frequency oscillator 229 whose frequency is controlled by a reactance tube 231. The D.-C. control signal is applied to this reactance tube. The beat frequency oscillator further comprises a stable frequency oscillator 232 and a detector 233 to which the outputs of oscillators 232 and 229 are applied.

The output of detector 233 is a sine wave signal having a frequency equal to the difference in the frequencies of oscillators 229 and 232. This is the desired audio frequency.

Since a sawtooth wave, instead of a sine wave, is desired, the detector output is clipped and differentiated by units 234 and 236, respectively. The differentiated pulses are applied to a sawtooth generator 237 where the positive differentiated pulses trigger the generator to produce a sawtooth wave having a fundamental frequency equal to said desired audio frequency.

The beat frequency oscillator may readily be designed so that the frequency of its output is a linear function of the direct current applied to reactance tube 231.

In the example illustrated, the direct current output of meter 226 increases linearly with increase in applied frequency, and the frequency of the beat frequency oscillator increases linearly with increase in direct current applied to the reactance tube.

In operation, when the sawtooth wave at the frequency meter input changes from one frequency to another, the beat frequency oscillator output follows this change and, likewise, changes from said one frequency to said other frequency. This beat frequency oscillator change, however, is comparatively gradual. The rate of change is controlled by the filter 227 as discussed hereinafter.

Suitable frequency meters for the present purpose are well known in the art. One such meter is shown and described on page 958 of the text, Radio Engineers' Handbook by Terman. A meter of this type is shown in Fig. 16a where an output resistor 241 has been substituted for the D.-C. meter, and where a cathode follower tube 242 is used to feed signal from the output resistor 241 to the filter 227.

In Fig. 16a the tubes 243 and 244 are gas triodes connected in an inverter circuit that comprises capacitors 246 and 247. These capacitors are alternately charged from the regulated +B supply voltage on the positive and negative halves of the cycle of the applied signal. Each time a gas triode becomes conducting, it extinguishes the other gas triode. Thus, assuming tube 244 is conducting, as soon as tube 243 is made conducting, it puts a short across tube 244 to extinguish it. The shorting connection includes a capacitor 248.

The charging currents of the capacitors 246 and 247 flow through the double diode 249 and through the load resistor 241 as a direct current. Any pulsations in this direct current may be smoothed out by a capacitor (not shown) across the load resistor. Such a capacitor is not provided in the circuit illustrated as sufficient smoothing is provided by the filter 227.

It will be noted that, between charging current pulses, the charges on capacitors 246 and 247 leak off by way of resistors 251 and 252, respectively.

If desired, the sawtooth wave may be applied directly to the frequency meter as indicated in Fig. 16a. However, it may be preferred first to clip the sawtooth wave to produce a square wave that is applied to the frequency meter. Or the sawtooth wave may be passed through a bandpass filter to obtain substantially a sine wave that is applied to the frequency meter.

As examples of other suitable frequency meters, reference is made to the audio frequency meter type No. 306–A manufactured by Radio Corporation of America and also the frequency meter shown on page 571 of the text, Electronics Manual for Radio Engineers, by Vin Zeluff and John Markus, first edition, published by McGraw-Hill Book Company, Incorporated.

Suitable variable frequency oscillators, such as beat frequency oscillators, are so well known that it is not necessary to describe circuit details. It may be noted that suitable reactance tube circuits for variable frequency oscillators are described in the article by Charles Travis entitled "Automatic Frequency Control," beginning on page 1125 of the October 1935 issue of the periodical Proceedings of the Institute of Radio Engineers.

In practice, it is generally found that the frequency glider need not have an operating range greater than two octaves. Because of this limited frequency range, there is no difficulty in designing and adjusting the circuit so that the beat frequency oscillator output follows the frequency meter input very closely in frequency.

It may be desirable to provide more than one frequency glider for a music synthesizer channel, one frequency glider to have a range for the trombone, another a range for a violin, et cetera. Only one frequency glider at a time is used. The point is that a two octave range is sufficient for any one musical instrument.

The frequency glider, of course, must be adjusted initially so that its output has the same frequency as that of the glider input signal. This, for the most part, is done by adjustment of the beat frequency oscillator. It may also be done, possibly as a final adjustment, by adjusting a variable tap 253 on the output resistor of the cathode follower tube 242.

The function of the filter 227 will now be described with particular reference to the graphs of Fig. 16d. Flter 227 in the form shown in Fig. 16 comprises a variable resistor 254 and a variable inductor 256 in series, and a variable capacitor 257 in shunt. The inductor 256 and capacitor 257 are given such values that they resonate at some low frequency so that the signal applied to the reactance tube 231 overshoots when gliding from one note to another as shown by the graph 258 in Fig. 16d.

Since the oscillator output frequency follows the overshoot and the following slow oscillation, also shown by graph 258, the effect is to put a wobble in the tone just before it settles down to a steady tone. This is an effect often found in music. It may occur as a trombone player starts to sound a new note. The same effect is found in singing.

The filter 227 may be made to resonate at about eight cycles per second, for example. In this case the values may be 400 henrys for inductor 256, one microfarad for capacitor 257, and 100 ohms for resistor 254. The 100 ohms includes the resistance of coil 256. The resistor 254 may be adjusted to vary the amount of the overshoot and the duration of the wobble.

As another example, the filter 227 might be adjusted to resonate at 16 cycles per second.

Instead of the filter 227 as shown in Fig. 16, the filter shown in Fig. 16b might be used. It comprises a resistor and an inductor in series. It also is tuned to resonate at a low frequency.

In some cases it will be preferred to have no overshoot. In such cases a resistor-capacitor filter such as shown in Fig. 16c may be used in place of the filter 227 shown in Fig. 16. This filter comprises a variable series resistor 259 and a variable shunt capacitor 261. Use of this filter will give the result shown by the graph 262 or the graph 263 depending upon the adjustment of the filter. Here the resistor 259 might, for example, have a value of 100,000 ohms and the capacitor 261 a value of one microfarad. This gives a filter time constant of 0.1 second so that it takes about 0.1 second to glide from one note to another.

*Vibrato unit*

Vibrato is a term used to designate primarily frequency modulation of a tone. In actual practice, particularly as the sound reaches the ear, it involves frequency and amplitude modulation or waveform modulation or the combination of all three. It is used in singing and in playing certain musical instruments such as the violin and the trombone.

Tremolo, strictly speaking, is a term used to designate amplitude modulation only. Such modulation, if done by a modulating signal having a single frequency, does not give a pleasing effect. It does not sound like a vibrato. For example, if a violin tone is amplitude modulated by a seven cycle per second sine wave signal, the result will not correspond to a vibrato.

We have found, however, that a vibrato effect can be obtained by means of amplitude modulation providing a suitable wave rich in harmonics is used as the modulating wave.

It is well known that a carrier wave that is frequency modulated by a sine wave signal consists of a component at the carrier frequency and of many side band components. It is also true that if a carrier wave is amplitude modulated by a non-sinusoidal signal having many frequency components, the resulting signal consists of a component at the carrier frequency and of many side band components, specifically, a side band component for each modulating frequency component.

The difference between a frequency modulated signal and an amplitude modulated signal having many side bands as above described is in the phase relation of the side bands. The human ear, however, is not sensitive to phase relations. Thus it appears that it should be possible to obtain a true vibrato effect so far as the ear is concerned by means of suitable amplitude modulation. It has been found in practice that this is correct, and that a good vibrato effect can be obtained by amplitude modulating with a sawtooth wave, for example.

Figure 17:
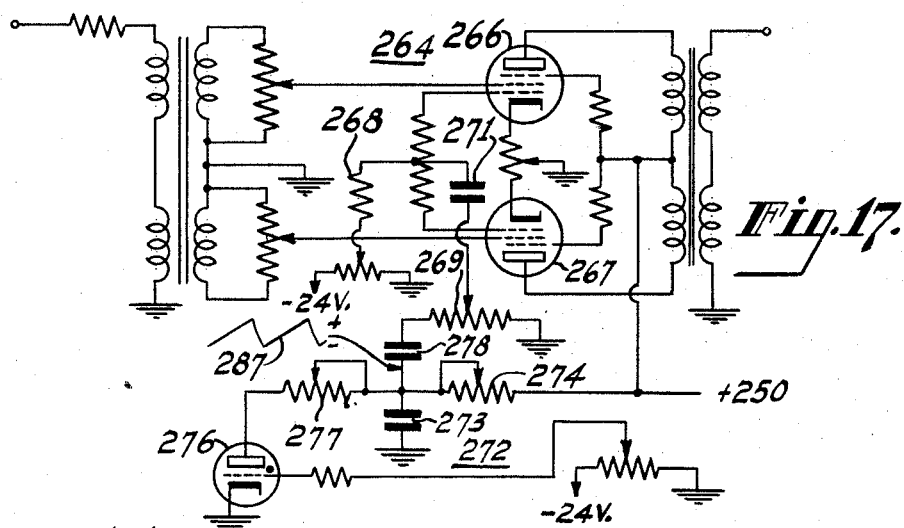
Fig. 17 is a circuit diagram of the vibrato unit shown in Fig. 1.

Fig. 17 illustrates one suitable circuit for obtaining a vibrato effect in accordance with the present invention.

It comprises a balanced amplifier 264 that includes two pentode amplifier tubes 266 and 267. The amplifier circuit itself is conventional and includes a suitable gain control circuit. In the example shown, the input signal is applied to the second grids of the pentodes 266 and 267 while the first grids are used for gain control. Suitable operating bias is applied to the first grids through a resistor 268.

Gain control voltage is applied to the first grids from a resistor 269 through a coupling capacitor 271.

Signal passed through the amplifier 264 is amplitude modulated by a sawtooth wave from a sawtooth generator 272 which may be of any suitable type. In the example shown, generator 272 comprises a capacitor 273 that is charged through an adjustable resistor 274 from a direct current source.

After the capacitor 273 charges up to a certain voltage, a gas tube 276 breaks down. The capacitor 273 then discharges through an adjustable resistor 277 and the gas tube 276. The break-down voltage of the tube 276 may be adjusted by adjusting the negative bias voltage applied to its grid. The charging and discharging rates of capacitor 273 may be adjusted by the resistors 274 and 277, respectively.

The sawtooth wave of generator 272 is applied by way of a coupling capacitor 278 and the resistor 269 to the gain control grids of the amplifier tubes 266 and 267.

Since the modulating sawtooth wave is rich in even and odd harmonics, the desired vibrato effect will be obtained in the vibrato unit output. The quality of the vibrato is determined by the particular sawtooth wave form used. This will be better understood from the following discussion.

Consider the analysis of a 333 cycle per second sine wave that is frequency modulated by a 7 cycle per second sine wave signal with a maximum frequency excursion of a semitone. The resulting modulated signal has the following main components with the relative amplitudes indicated in percentage of the unmodulated carrier amplitude:

333 cycles at 58%
340 cycles and 326 cycles (333±7) at 53%
347 cycles and 319 cycles (333±14) at 22%
354 cycles and 312 cycles (333±21) at 6%.

The equivalent amplitude modulated wave (except for phase relations) is a 333 cycle per second carrier wave modulated by the following sine waves with the amplitudes indicated in percentage of the unmodulated carrier amplitude:

7 cycles per second at 106% amplitude
14 cycles per second at 44% amplitude
21 cycles per second at 12% amplitude The resulting modulated wave has the following components:

333 cycles at approximately 100% amplitude
333±7 cycles at 53% amplitude
333±14 cycles at 22% amplitude
333±21 cycles at 6% amplitude The immediately preceding tabulation is strictly correct as to side bands. As to the carrier component, it is not exactly at 100% amplitude because of the overmodulation by the 7 cycle signal. Furthermore, it will be noted that this amplitude of approximately 100% differs substantially from the 58% amplitude of the carrier component in the case of the frequency modulated wave. This difference in carrier component amplitude has been found to be of no apparent importance. From listening tests it appears that the important thing is to have the correct side band components of the correct amplitude.

Figure 17A:
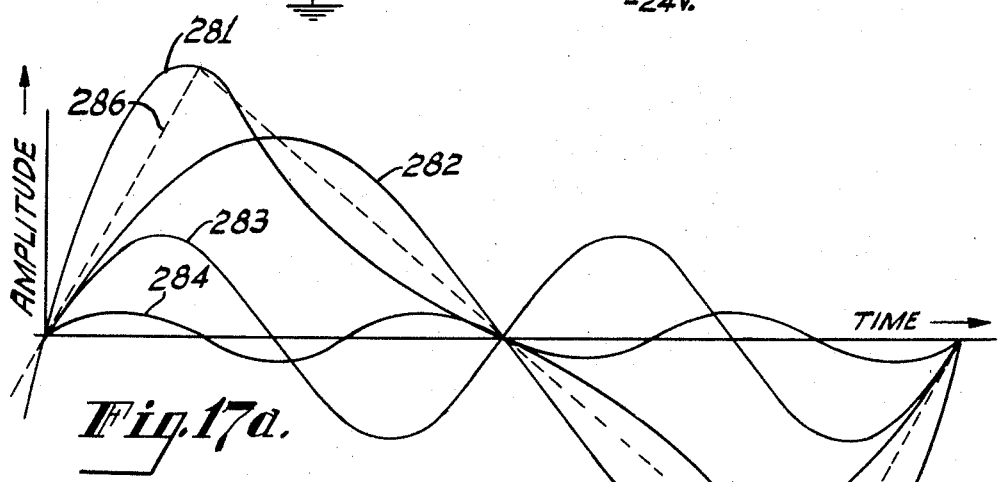
Figs. 17a and 17b are graphs that are referred to in explaining the operation of the vibrato unit.

In Fig. 17a the graph 281 shows the wave form of the above-mentioned amplitude modulating wave having the 7 cycle, 14 cycle, and 21 cycle components of substantially the amplitudes tabulated. These three components are represented by the graphs 282, 283, and 284, respectively. The amplitudes actually assumed in the graphs are 100%, 50%, and 12.5% for the 7, 14, and 21 cycle components.

It is apparent that the wave form of the signal 281 can be fairly closely approximated by a sawtooth wave, as indicated by the dotted graph 286, where the steeper side of the sawtooth occupies about one-third of the total sawtooth duration.

Figure 17B:
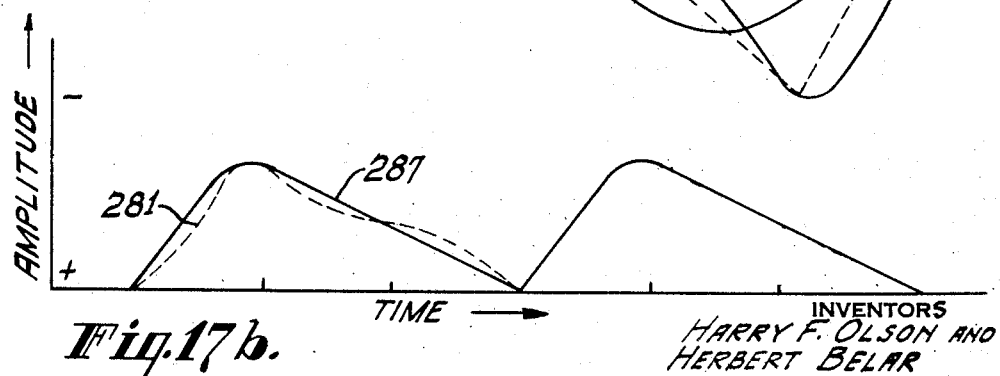

Fig. 17b shows the graph 281 repeated in dotted line and also shows an actual sawtooth wave 287 that has been found in practice to satisfactorily approximate the wave 281. The difference between the sawtooth 287 of Fig. 17b and the sawtooth 286 of Fig. 17a is that sawtooth 287 bends over somewhat on the steep side. The wave 287 is one that is readily generated by a simple circuit and has been found to be a sufficiently close approximation to a theoretically correct wave shape such as that shown by graph 281.

Referring again to Fig. 17, here the sawtooth wave 287 is drawn in the more usual way with the wave rising upward in the positive direction. As previously indicated, the ratio of the rising portion of the sawtooth to the falling portion of the sawtooth may be adjusted by adjustment of the resistors 274 and 277.

From the foregoing discussion it will be understood that no one particular waveform is required for amplitude modulating the musical tone being passed through amplifier 264 (Fig. 17) to obtain the desired vibrato effect. A waveform such as shown by graph 281 may, of course, be used but the oscillators and adding circuit required to generate it involve considerably more apparatus than is required to generate a sawtooth wave.

The precise ratio of one to two of the steep portion to the gradually sloping portion of the sawtooth wave is not essential although approximately this ratio seems to give the best results. It may be noted that the two extreme limits of a sawtooth have been found to be unsatisfactory. These two limits are: first, a sawtooth wave where the steep portion is substantially vertical instead of sloping; second, a symmetrical triangular wave. The first of these gives a thump each time the steep portion occurs. The second of these does not give the proper sound effect, apparently due to the fact that it does not contain any even harmonic terms.

It should also be pointed out that listening tests show that the amount of modulation by the sawtooth wave to obtain a satisfactory vibrato effect should be substantially less than 100%. This is contrary to what is indicated by the tabulated values previously given where 106% modulation (or approximately 100%) given for the 7 cycle component. Such 100% modulation of the sawtooth tone wave gives too much sound variation or vibrato effect.

In practice, it has been found that about 50% modulation by the sawtooth tone wave is satisfactory. Stated differently, the 7 cycle, 14 cycle and 21 cycle components modulate the sawtooth carrier wave at about 50% modulation, 22% modulation and 6% modulation, respectively. This value of 50% modulation by the sawtooth wave is not at all critical. In some cases, for example, instead of 50% modulation, it might be preferred to have 25% modulation or 75% modulation.

In the tabulations of side bands for comparing frequency modulation with sawtooth amplitude modulation, it was assumed that the carrier was a sine wave of 333 cycles per second. In the synthesizer, the corresponding carrier that is applied to the vibrato unit amplifier 264 (Fig. 17) is, of course, a sawtooth wave. However, it is believed that the comparison as made assuming a sine wave carrier is accurate, it being remembered that a sawtooth wave actually consists of a fundamental sine wave component and various harmonic sine wave components.

It should be pointed out that the reason for employing a vibrato unit of the type described instead of employing a true vibrato or frequency variation is that our synthesizer utilizes frequency sources that are held accurately at a constant frequency. The specific frequency sources illustrated are tuning fork sources and considerable care is taken in the design to make the frequency of each source accurate. With such sources it is possible to synthesize music precisely and results can be duplicated. The spectrum controller, for instance, comprises sharply tuned filters. Any variation in a frequency source would change the effects produced by such filters.

*Hiss generator*

Fig. 4 shows one suitable type of random noise or hiss generator that may be used as the hiss generator 77 shown in Fig. 1, or as the hiss generator shown in Fig. 2a, connected to input terminal number (14) of the relay tree 71. In the example shown it comprises a gas tube 288 that has regulated D.-C. voltage applied to its anode. The noise generated in the tube is amplified by a suitable audio frequency amplifier 289. Circuit values in ohms and microfarads, and the tube type, are indicated merely by way of example. The gas tube might be a diode instead of a triode as shown. There are, of course, other random noise generators that may be used instead of a gas tube noise generator.

Random noise is useful as an addition in simulating such instruments as drums, maracas, tambourines, string and wind instruments. When used with band pass filters with a narrow frequency pass band the noise source can be used to produce weird and unusual sounds.

*Drum sounds*

It has been found that one way of simulating the sound of a drum is to pass the random noise through the octaver. This results in substantially random operation of the octaver. By way of example, a bass drum sound may be obtained in this way by dividing the random noise down by thirty-two (to the lowest frequency) and then accentuating the one hundred cycle per second component. The bass drum sound is executed by applying to the envelope shaper and keyer 121 (Fig. 1) an unblocking pulse of a shape such as pulse 172 (Fig. 6a) to produce a percussive sound.

It has also been found that a snare drum sound may be obtained by feeding the outputs of all the tuning fork sources into the mixer (Fig. 2a), preferably with the tone from one source emphasized, applying the mixed tones to the octaver 72, taking off the sawtooth output from the shaper 91 following the first divider 81 (Fig. 2a), and passing this output through a high pass filter that cuts off at 250 cycles per second. It may be preferred to divide down by more than two and/or to use a high pass filter with a different cut-off frequency, or to use no filter. The important point is that a large number of tones that are related to each other by irrational numbers such as those of the tempered scale are mixed and applied to the octaver to produce a more or less random operation thereof. The snare drum sound is executed by applying an unblocking pulse to the shaper and keyer 121 (Fig. 1) that is of a shape to give a percussive sound. The unblocking pulse 171 (Fig. 6a) has a suitable wave shape for this purpose.

*Other system embodiments*

It should be understood that the invention is not limited to the particular arrangement of units shown in Fig. 1. It has previously been mentioned that the frequency glider unit 122 and vibrato unit 192 may or may not be used. If both units are used, the vibrato unit should follow the frequency glider unit. Otherwise their locations in the channels are not particularly important although there may be certain advantages for certain locations.

The vibrato unit may be the last unit in a channel. There may be a vibrato unit in only one channel or a vibrato unit in each channel. The two synthesizer channels may feed into a vibrato unit common to the two channels. On the other hand, the vibrato unit may be connected to be included in only part of the spectrum controlling circuits of a spectrum controller unit such as unit 191.

The frequency glider unit 122 may precede the octaver unit 72, if desired. In fact, the frequency glider unit may be inserted at any point in one or both synthesizer channels, except that it should precede the vibrato unit if a vibrato unit is employed.

It has previously been indicated that the volume equalizers 194 are not essential although desirable.

The spectrum controller 191 may be omitted in some cases. For example, for piano music it is found that the only spectrum control that is required is a filter for cutting off some of the high frequency components. When used, the spectrum controller 191 may be located ahead of the master volume control unit 173 if desired. Or it may be found desirable to put the spectrum controller ahead of the envelope shaper and keyer unit 121.

As to the position of the envelope shaper and keyer unit 121, it may be the last unit in a synthesizer channel. This may not be desirable if ringing or resonator circuits are being employed in the spectrum controller as the ringing effect would be reduced by the envelope shaping. On the other hand, it may be desirable in some cases to put the unit 121 at the end of the channel so that it will be effective to change an envelope shape. The shaper and keying unit 121 should not precede the octaver as the octaver would wipe out any shaping done by the unit 121.

From the foregoing, it will be seen that, generally speaking, the various units of the synthesizer channels may be located in any desired order.

It has previously been pointed out that various coding and relay arrangements may be employed in place of the specific one illustrated. Time and effort may be saved by so coding as to avoid having to punch a row of code holes to obtain the effect of a slot. This may be accomplished by employing holding circuits in the relays.

Figure 17C:
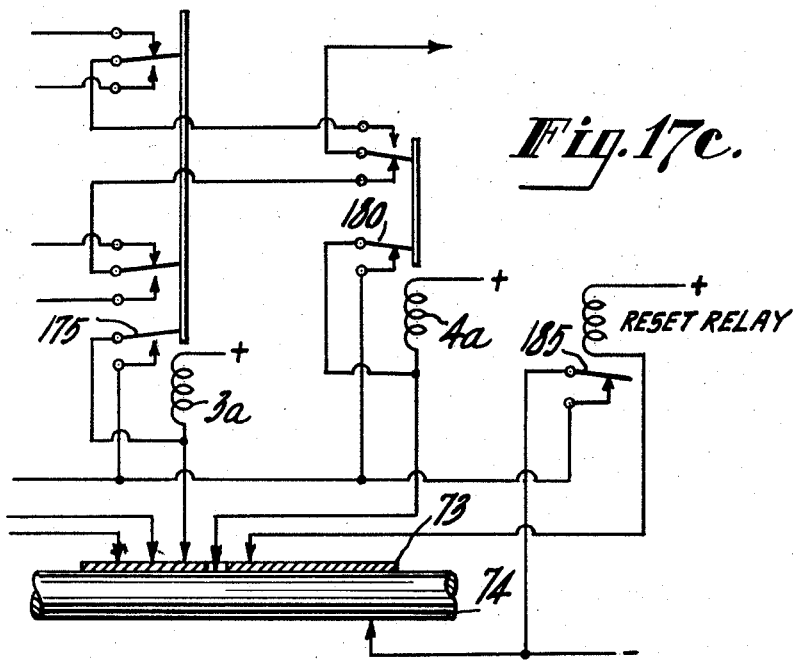
Fig. 17c is a circuit diagram illustrating a relay tree arrangement with holding relays for minimizing the number of code holes required in a paper record roll.

Fig. 17c shows part of a relay tree corresponding to the relay tree 71 of Fig. 2a. The relay coil for each group of relay contacts is provided with a holding circuit that includes an extra set of contacts. For example, coils 3a and 4a have holding contacts 175 and 180, respectively, associated therewith.

A clearing or reset relay with contacts 185 is provided. It is apparent that if the reset relay is energized momentarily the holding circuits of relay coils such as 3a and 4a are broken.

Figure 17D:
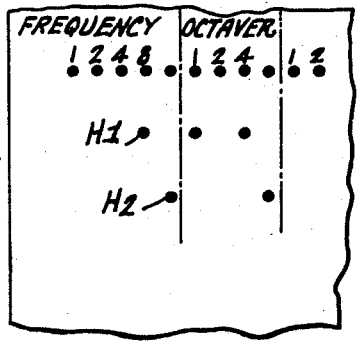
Fig. 17d is a view of part of a paper record roll illustrating how the code holes are punched for use with the circuit of Fig. 17c.

The method of coding the paper record roll and the operation of the circuit of Fig. 17c will be understood by referring to Fig. 17d. Fig. 17d shows a portion of a paper record roll punched for operation with relays using holding circuits. The top row of holes is not part of the record and is shown for comparison purposes only. It will be noted that in addition to the previously described coding holes there is an extra hole for operating the reset relay.

In Fig. 17d the binary number eight hole H1 has been punched to set up the relay circuit that selects the frequency connected to the number (8) input terminal (see Fig. 2a). Thus the relay coil 4a will be energized and its holding circuit closed as this hole passes under the cooperating brush. The selected frequency source will continue to be connected through to the relay tree output terminal until the reset relay breaks the holding circuit. This happens when the reset hole H2 passes under its cooperating brush.

Similarly, the coding for the octaver in the example shown consists of the binary number 1 and binary number 4 holes. The number (5) input thus selected remains connected through the relay tree until a reset hole passes under its cooperating brush. Then the contacts 185 open momentarily to break the holding circuits;

next the contacts 185 reclose. Meanwhile relay coils 3a, 4a, et cetera have been de-energized.

Instead of employing separate units for volume control and for envelope shaping and keying, the two units may be combined. Fig. 7a illustrates one example of such an arrangement where the master volume control bias is applied to the envelope shaping and keying unit 127. The unit is otherwise the same as the envelope shaping and keying unit illustrated in Fig. 6. As shown in Fig. 7a, the master volume control bias is controlled the same as for the volume control unit shown in Fig. 7, but it is applied to control grids of the tubes 141 and 142 in the envelope shaper and keyer unit.

In another modification of the system, the note execution or unblocking of the synthesizer channel is done by the master volume control unit, in which case the envelope shaper and keyer unit may be omitted. A circuit for this is shown in Fig. 7b. Basically this is the same unit as the volume control unit shown in Fig. 7 but with the tubes 179 and 181 normally biased beyond plate current cut-off. These tubes are unblocked and a note or tone is executed in response to actuation of the relay tree 183 in accordance with the coded record. In this case the bias voltage supplied from the relay tree 183 is of positive polarity so as to unblock the amplifier.

In Fig. 7b the rate of rise of the tone envelope is determined by the time constant of capacitor 188 and resistor 184. Actually, the comparatively low impedance resistor 182 will change the time constant a minor amount as its value is varied. This minor effect can be avoided, if desired, by supplying the output of relay tree 183 to resistor 184 through a cathode follower tube.

The time constant of capacitor 188 and resistor 184 is a function of the value of the portion of resistor 184 that is included in the circuit. This is determined by the relay tree 126 which shorts out parts of resistor 184 in accordance with the coding on the coded record.

The graphs in Fig. 7c show by way of example some of the effects that may be obtained by using the circuit of Fig. 7b. The three graphs show tone envelopes with three different rates of rise as determined by three different connections through the relay tree 126. Also, each graph shows an envelope that has its amplitude changed during the sounding of the tone, i. e., during its appearance at the output of the synthesizer channel.

It should be noted that in each case, in the examples illustrated, said amplitude change is slow as compared with the initial rate of rise of the tone envelope. Thus, the solid line graph shows a medium initial rate of rise followed by a slow increase in amplitude or volume. The dash line graph is similar but with a slower rate of rise and a lower volume. The dash-dot graph shows a faster rate of rise with, in this example, a higher volume, followed by a gradual decrease in volume, the latter volume being held until the termination of the tone.

This slower rate of rise or fall in amplitude of a tone while it is being sounded is obtained by actuating relay tree 126 during said sounding to increase the time constant of the resistor-capacitor circuit 184, 188. For example, at the same time or just before the volume control relay tree 183 is actuated to change the volume of a tone being sounded, the relay tree 126 is actuated to change the time constant.

The advantage of the arrangement of Fig. 7b over those previously described is that the rate of rise or fall of volume may be changed rapidly for successive tones by the coded record.

It is apparent that the circuit of Fig. 7b provides great flexibility in shaping a tone envelope. The fast envelope rise followed by a comparatively slow rise or fall in amplitude is a characteristic of the tones obtained in playing many musical instruments.

The feature of keying by the volume control signal, as shown in Fig. 7b, cannot be used in synthesizing the music of some instruments, such as a piano, because of the fast time rise required for the tone envelope. However, the feature of changing the time constant of the volume control circuit while sounding a tone is of general application. This feature obviously may be applied to the volume control circuit of Fig. 7 as discussed hereinafter.

It may be mentioned that relay ambiguity at the relay tree 183 does not cause any difficulty in operation since the rise times of the tone envelopes to be produced are slow enough to give the relay sufficient time for proper operation.

It will be understood that when the tones are executed by actuation of the volume control unit, as by actuating relay tree 183 of Fig. 7b, it is desirable in general that the other relay trees have been actuated prior to actuation of the relay tree 183 so as to avoid relay clicks and other noise.

As previously indicated, where both a master volume control unit and an envelope shaper and keyer unit are used, with the volume control unit of the type shown in Fig. 7, it may be desirable to provide means for changing, in response to coding, the time constant of the circuit comprising capacitor 188 and resistor 184. This may be done by providing an extra relay tree (not shown) and additional coding therefor on the coded record for changing the value of resistor 184 just as described in connection with Fig. 7b. In this case the changed time constant has the effect of changing the rate of change in volume while sounding a tone, the initial rate of rise of the tone envelope being determined principally by the envelope shaper and keyer unit.

While the synthesizer operation has been described particularly in connection with the use of a normally blocked channel that is unblocked to sound or execute a tone, it should be understood that the invention is not limited to such operation. Instead, all units of a channel, with the exception of the tone source, may first be set up by the coded record and then the selected tone connected to the input of the channel to execute the tone. This method of operation is not considered as satisfactory as unblocking a normally blocked channel, but it can be used, particularly if suitable vacuum tube relay switching means is employed for connecting the selected tone to the channel input. A suitable type of switching for the purpose is shown by way of example in Fig. 4a, previously described.

*The machine panel*

Figure 20:
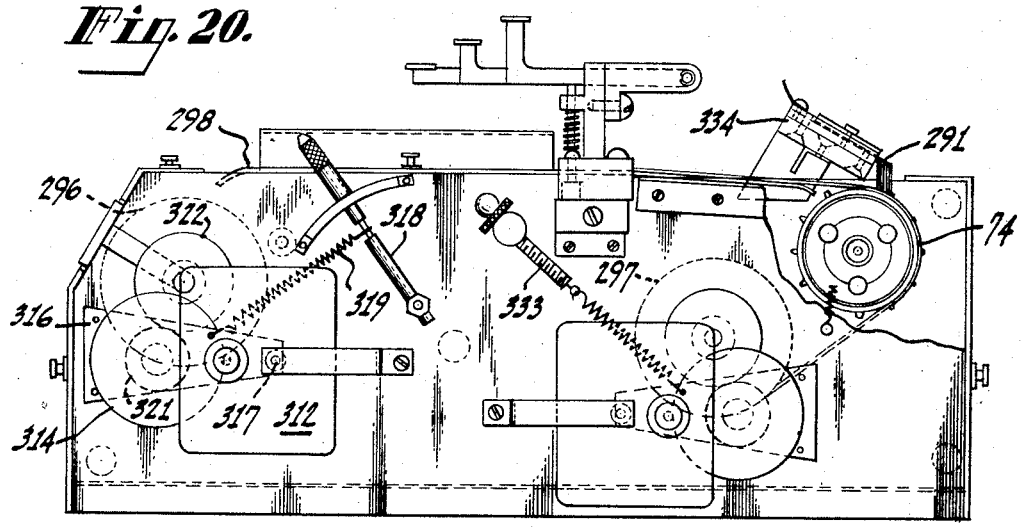
Fig. 20 is a view showing the right end of the machine panel as viewed in Fig. 19.

Refer now to Figs. 18, 19, and 20 which show the machine panel or mechanism for driving the paper record 73. This unit also includes the brushes 291 for making contact as the code holes pass under them. These brushes 291 correspond to the contact points 1 to 36 shown in Figs. 1, 2a, and 2b. Associated with the machine panel unit as a matter of convenience is the mechanism 292 with thirty-six keys 293 for punching the code holes in the paper roll. The code punching unit 292 obviously may be a separate unit if desired.

In Fig. 19, to simplify the drawing, only part of the brushes 291 and keys 293 are shown.

The machine panel unit comprises the driving roller 74 having sprocket teeth at each end to engage sprocket holes in the paper roll 73. The driving roller 74 is also the element through which an electrical circuit is completed when a brush comes into contact with it. Preferably the outer shell of roller 74 is insulated from the rest of the machine panel and a brush (indicated schematically at 294 in Fig. 1) is provided to make contact with it.

The machine panel also includes a record supply roller 296 and a take-up roller 297 (Fig. 20). Suitable support for the paper record as it is pulled through the machine is provided by a plate 298.

The record driving roller 74 is driven from a motor drive shaft 299 (Fig. 18) through a gear train as shown in Figs. 18 and 19. The gears in the gear train may be changed to run the paper record through at any one of several different speeds.

Suitable means is provided for disengaging the paper driving roller 74 from the gear train to permit rewinding, punching code holes, et cetera. As shown in Fig. 19 the gear wheel 301 of the gear train is slidably splined on the shaft of roller 74 so that it may be pulled against a spring 302 and out of engagement with the gear wheel 303. It may be held out of engagement by a slidable member 304 that may be slid under the head of a bolt 306.

It may be convenient to have a step-by-step advancing means for moving the paper roll forward from one code hole position to the next, particularly when punching code holes in the paper. Such advancing means may comprise a rod 307 that may be pushed forward so as to cause a dog 308 to engage a toothed wheel 309 secured to the shaft of roller 74.

A suitable counter 311 may be provided to assist in the code punching operation.

In Figs. 19 and 20 there are shown the rewind and take-up drives for the paper roll. Such drives are well known and need be described only briefly.

The rewind drive is a friction drive and comprises a motor 312 having a shaft 313 that engages a wheel 314 with a rubber rim. The wheel 314 is mounted on a plate 316 pivotally mounted at 317. The friction drive is made effective for rewinding by pulling the plate 316 upward by means of a lever 318 and a spring 319. This brings wheels 321 and 322 into driving engagement so as to drive the supply roller 296.

The take-up drive is also a friction drive and similar to the rewind drive. In this case suitable adjusting means 333 is provided so as to get proper take-up action and still permit the necessary slippage as the diameter of the paper on the take-up roll increases.

The brushes 291 are mounted on a strip of insulating material 334 and the individual brush connections cabled as shown in Fig. 18. The actual connections have been shown and discussed previously with reference to circuit and block diagrams.

Figures 21, 21B:
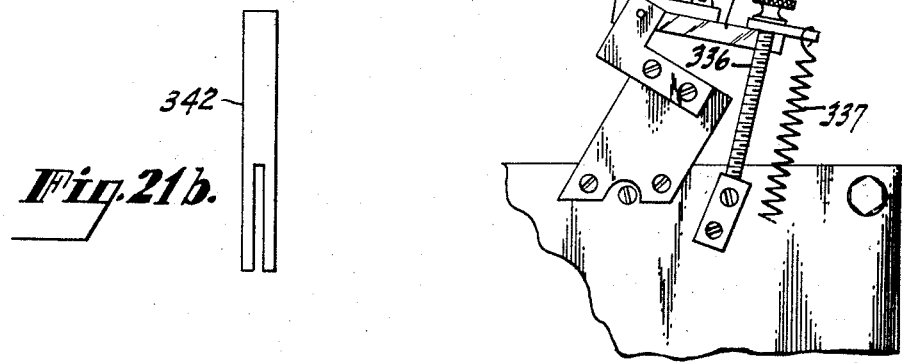
Fig. 21 is a fragmentary view of a portion of the machine panel shown in Fig. 19.
Fig. 21b is a view of one of the brush elements.

The brush mounting strip 334 is pivotally supported at each end as shown in Fig. 21. The strip 334 and the brushes (not shown in Fig. 21) may be raised by means of a threaded rod 336 so that the paper roll may be rewound without catching the brushes. When the strip 334 and brushes are let down, a spring 337 holds the brushes down in firm contact with the paper roll.

Means is provided to prevent rewind of the paper roll when the brushes are down. As shown in Fig. 19, this consists of a metal strip 338 attached to the left end of the brush mounting strip 334 so as to engage the toothed wheel 309 when the brushes are let down.

Figs. 21a and 21b show details of a preferred brush design which is not quite the same as that shown in Fig. 20. The mounting block 341 is a brass piece, for example, which is slotted at one end so that the individual spring strips 342 may be seated in the slot. The strips have metal spacers between them and are clamped in position by a screw 343. Each spring strip 342 preferably is bifurcated at the contact end as shown in Fig. 21b.

Figure 21C:
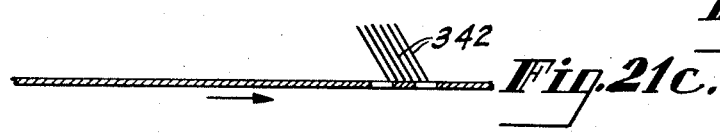
Fig. 21c is a view showing the relation, dimensions of the brush and the coding holes in the paper roll.
Figure 21D:
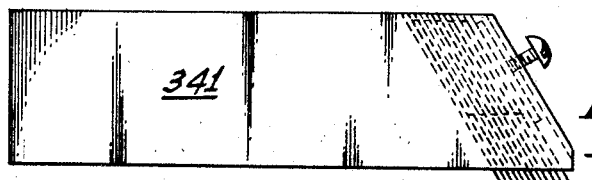
Fig. 21a is a side view of a preferred brush assembly for use in the machine panel.

Fig. 21c shows the relation of the dimensions of the brush and coding holes. Successive coding holes preferably are spaced apart by the diameter of a hole. The spacing of the spring strips 342 preferably is such that at least three of said strips make contact at one time. This may be three in contact at one hole, or two in contact at one hole and one in contact at the next adjacent hole. The brush never breaks contact at one hole before making contact at the next adjacent hole. Thus, a row of holes will provide continuous contact and give the same result as a slot in the paper would. Slots may be cut in the paper but they would tend to weaken the paper roll so that it would be more likely to tear.

The code punching unit 292 consists of a row of paper punches that are actuated by the keys 293. Each key is mounted on a bar that is pivoted at the opposite end. When the bar is pressed down by the key, it forces a paper punch rod 344 (Fig. 18) through the paper roll. Underneath each rod 344 there is, of course, a hole in the plate 298 into which the rod fits when pushed down. Springs are provided to return the keys to position.

The paper punch rods 344 are aligned with the brushes 291 so that the first key at the left will punch holes that will move under the brush corresponding to contact point number 1 (Figs. 1 and 2a), the next key from the left will punch holes that will move under the brush corresponding to contact point number 2, et cetera.

The keys 293 of the code punching unit preferably have the binary scale numbers marked thereon to facilitate punching a record. Thus, the first four keys, reading from left to right, are numbered 1, 2, 4, and 8. These punch the code for selection of a frequency or note. This is evident by reference to Figs. 1 and 2a since these keys punch the code holes that pass under contact points 1, 2, 3, and 4 (corresponding to the first four brushes 291 reading from left to right).

Similarly, the next three keys are marked 1, 2, and 4. These keys punch the code for selecting the desired octave. The next four keys are marked 1, 2, 4, and 8. They punch the code for selecting the frequency spectrum. The next three keys are marked 1, 2, and 4. They punch the code for envelope shaping and for execution.

The next four keys are marked 1, 2, 4, and 8. They punch the code for master volume control, and are the last of the keys in the group used to punch the coding for the first synthesizer channel.

The remaining eighteen keys are numbered in the same way as the first eighteen keys just described. They are used to punch coding for the second synthesizer channel.

In practice the different groups of keys may be colored to facilitate the operation of punching codes. For example, the note selecting group of 1, 2, 4, and 8 may be white; the octave group 1, 2, and 4 may be red; the spectrum group 1, 2, 4, and 8 may be green; the envelope shaper and execution group 1, 2, and 4 may be blue; and the master volume group 1, 2, 4, and 8 may be yellow.

*Sample record*

Figure 22A:
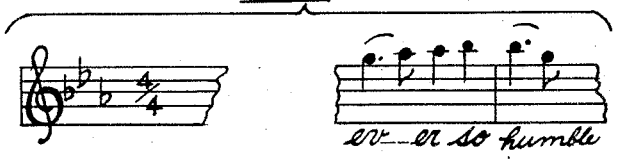
Fig. 22a shows the conventional musical notation of the musical phrase that is coded in the record shown in Fig. 22.

Fig. 22 is a view of a sample punched paper record for playing a phrase of Home Sweet Home. The record is drawn to scale and has the length in inches as indicated. Two inches per second is about the correct speed to run it through the machine panel. Fig. 22a shows the corresponding phrase in conventional notation.

Fig. 22 with the legends thereon is practically self-explanatory in view of the foregoing description of the synthesizer. However, several points may be noted. The holes in a continuous line at the top of the figure are not part of the record. They are shown merely for comparison purposes, one hole having been punched by each of the keys 293. These holes are numbered, like the keys 293, in accordance with binary code numbering.

It will be seen that the coding on the left half of the record is for one synthesizer channel and that the coding on the right half is for the second synthesizer channel. By referring to the "envelope and execution" coding it will be seen that the notes are executed alternately by the first and second channels.

For illustration purposes, Fig. 22 shows more changes in frequency spectrum and in envelope shape than ordinarily would be used in a short phrase of music.

As to frequency spectrum, the spectrums that are called for by code numbers 2, 3, and 4 are used. The musical phrase begins with execution of the first note in the first channel using the spectrum called for by code number 2. It remains the same for the second note, which is executed in the second channel, and for the third note which is executed in the first channel.

For the fourth note, executed in the second channel, the spectrum is changed to that called for by code number 4. The fifth note, executed in the first channel, is given the spectrum called for by code number 3 (i. e., 1+2=3).

The last note, executed in the second channel, again has the frequency spectrum called for by code number 2.

In the specific example being described, the code number 2 spectrum was provided by a "differentiating" type compensator circuit that has the effect of accentuating high frequency components. It was the only network of the spectrum controller connected between the relay tree 174 and the number (2) input terminal of the volume equalizer 194 (Fig. 2b). This specific network connection and the two connections described below are not illustrated. They are only samples of many that may be used.

The code number 3 spectrum was provided also by a single compensator network. It was of the "integration" type that accentuated the lower frequency components.

The code number 4 spectrum again was provided by a compensator network that accentuated high frequency components. However, as compared with code number 2 spectrum, it began boosting high frequency components at a point nearer the high frequency end of the frequency spectrum.

Reference to the master volume control coding will show that the volume is changed during the playing of the musical phrase. On playing the first note, it is changed while the note is being executed.

Reference to the envelope shaping and execution coding will show that the envelope shaping is changed for some of the notes. Envelope shaping according to code numbers 1, 3, and 5 have been used. These give different rates of rise of the unblocking or execution pulse.

It will also be noted that the envelope shaping and execution code starts after the channel has been set up as to frequency, octave, et cetera, and ends while the channel is still set up. The advantages of this have been discussed in detail. An exception to this sequencing is the change in volume while playing the first note. This can be done without getting a click or thump if the volume is changed by changing the bias on a properly designed amplifier as previously discussed.

Attention is again directed to the fact that to synthesize some sounds or tones their frequency spectrum should be changed while the sound or tone is appearing at the synthesizer output. This is accomplished by prior coding of the coded record just as in the example given in the sample record for the case of changing volume while sounding a tone. In some instances it will be found desirable to change both volume and spectrum while sounding a tone.

*Recording*

As previously mentioned, the principal use for the synthesizer will probably be for the production of phonograph records.

Figure 23:
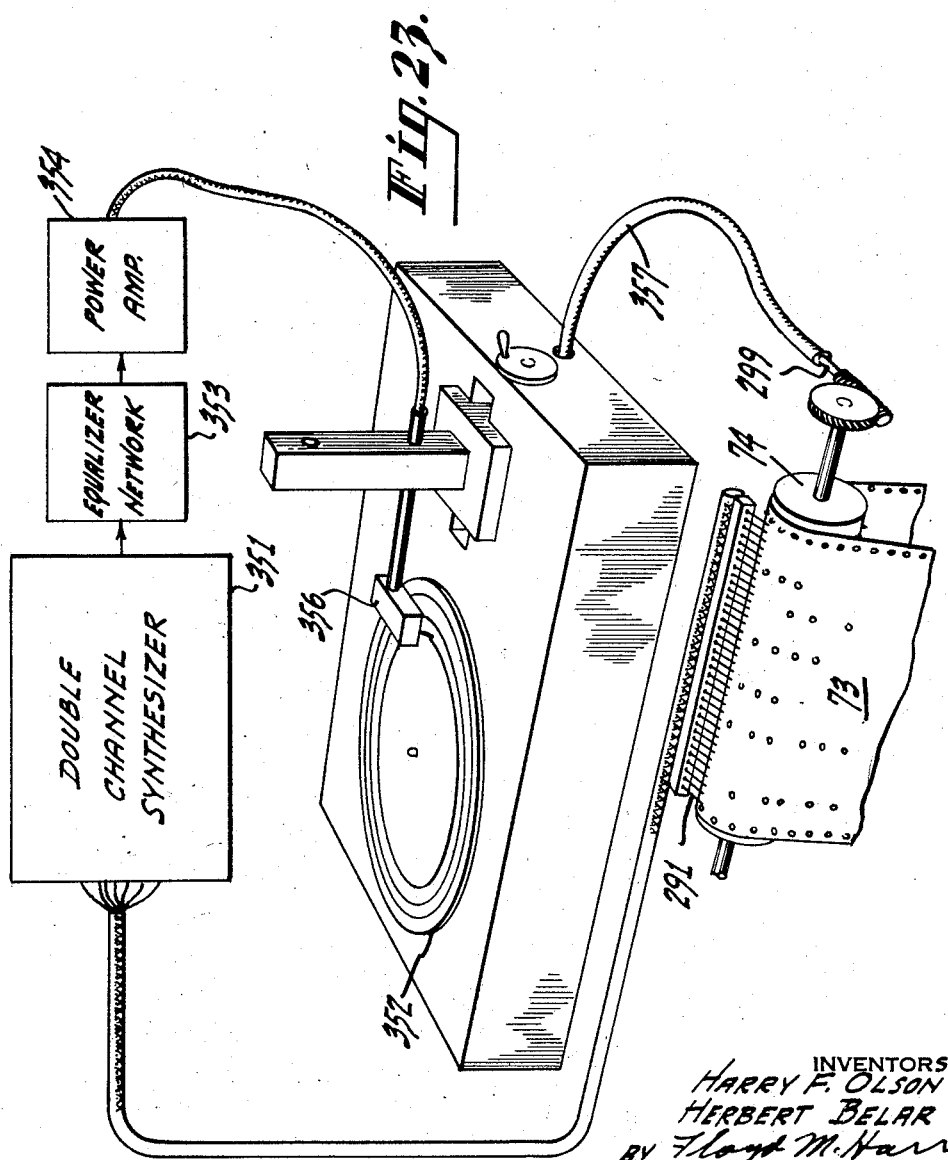
Fig. 23 is a view in perspective showing the overall system in accordance with the present invention as employed for producing phonograph records.

Fig. 23 shows a recording system connected to the synthesizer indicated at 351 for cutting a record 352. The output of the two synthesizer channels is passed through an equalizer network 353 to compensate for the record characteristic in accordance with common practice. The signal is then amplified by a power amplifier 354 and fed to the record cutter 356. This particular recording system cuts a conventional 33⅓ R. P. M. lateral modulation disc.

The disc recorder is coupled to the record paper drive roller 74 by means of a flexible shaft 357. In this way the paper record 73 is synchronized with the disc record 352.

A sixteen inch disc record can accommodate six three-minute recordings. Thus by way of example, after six complete recordings have been made, which represent six different musical renditions, the six recordings are combined in a single recording by means of a double turntable recording system shown in Fig. 24.

As shown in Fig. 24, the recorded music is taken off the record by a plurality of pickups 358 (six in the present example) and supplied to six suitable volume control units 359 such as adjustable gain amplifiers. Thus the level of the individual recordings may be adjusted at units 359.

The outputs of units 359 are supplied to a preamplifier 361 where they are combined. The combined outputs are then passed through an equalizer network 360 and amplified in a power amplifier 362. The amplified signal is fed to a record cutter 363 to cut a record 364. The record 364 may now be a complete record but in many cases further combining of recordings will be required. In that case the record 352 is replaced by another record and another recording cut on the record 364. With the recording system illustrated, it is possible to record thirty-six individual records.

If it is desired to combine still more recordings, the record 364 is transferred to the upper turntable and the recording process repeated. In this step 216 records can be recorded. By following this procedure any number of individual records may be recorded, and all recordings are always synchronized. It is apparent that the synthesized music of a full symphony orchestra may be recorded if desired.

What is claimed is:

1. A music synthesizer comprising a coded record, means for synthesizing each individual note of a piece of music in response to the coding on said record, said means including means for producing tones of a musical scale.

2. A music synthesizer comprising a coded record, means for synthesizing each individual note of a piece of music in response to the coding on said record, said means including means for producing tones of a musical scale, and a plurality of means connected in cascade with said tone producing means for individually controlling in response to said coding a characteristic of a tone passed therethrough.

3. In combination, means for producing tones of a musical scale, a coded record, means responsive to said record for selecting said tones in rapid succession in accordance with the coding on said record, and means responsive to said record for determining the envelope shape of the selected tone in accordance with the coding on said record.

4. In combination, means for producing tones of a musical scale, a coded record, means responsive to said record for selecting said tones in rapid succession in accordance with the coding on said record, and means responsive to said record for determining the envelope shape and spectrum of the selected tone in accordance with the coding on said record.

5. In combination, a music synthesizer to be operated by a coded record, said synthesizer including means for driving a coded record, means for recording the output of said synthesizer on a recording record, said last means including means for driving a recording record, and means for driving said coded record and said recording record in synchronism.

6. In combination, a music synthesizer to be operated by a coded record, a coded record, means for driving said coded record, means for recording the output of said synthesizer on a recording record, said last means including means for driving said recording record in synchronism with the driving of said coded record.

7. In combination, a plurality of source means for producing tones of a musical scale, control means connected in cascade in a signal channel with said source means for changing a characteristic of a selected tone, a coded record, means responsive to said coded record for selecting said tones in rapid succession and for causing each selected tone to appear at the output terminals of said channel, and means including said control means for causing at least certain of said selected tones to change in said characteristic in accordance with coding on said record while they are appearing at said output terminals.

8. In combination, means for producing tones of a musical scale, control means connected in cascade in a signal channel with said first means for changing the frequency spectrum of a selected tone, a coded record, means responsive to said coded record for selecting said tones in rapid succession and for causing each selected tone to appear at the output terminals of said channel, and means including said control means for causing at least certain of said selected tones to change in their frequency spectrum in accordance with coding on said record while they are appearing at said output terminals.

9. In combination, a plurality of source means for producing tones of a musical scale, amplitude control means connected in cascade in a signal channel with said source means for determining the amplitude of a selected tone, a coded record, means responsive to said coded record for selecting said tones in rapid succession and for causing each selected tone to appear at the output terminals of said channel, and means including said amplitude control means for causing at least certain of said selected tones to change in amplitude in accordance with coding on said record while they are appearing at said output terminals.

10. In combination, means for producing tones of a musical scale, amplitude control means connected in cascade in a signal channel with said first means for determining the amplitude of a selected tone, spectrum control means connected in cascade in said channel with said amplitude control means and said first means for controlling the frequency spectrum of a selected tone, a coded record, means responsive to said coded record for selecting said tones in rapid succession and for causing each selected tone to appear at the output terminals of said channel, means including said amplitude control means for causing at least certain of said selected tones to change in amplitude in accordance with coding on said record while they are appearing at said output terminals, and means including said spectrum control means for causing at least certain of said selected tones to change in frequency spectrum in accordance with coding on said record while they are appearing at said output terminals.

11. In combination, means for producing and selecting any one of the tones in a plurality of octaves of a musical scale, amplitude control means for determining the amplitude of a selected tone, spectrum controller means for determining the frequency spectrum of the selected tone, selective switching means for connecting said first means, said amplitude control means and said spectrum controller means in cascade in a signal channel, and means for causing said tone to appear at the output terminals of said channel as modified by said amplitude control means and by said spectrum controller means.

12. In combination, means for producing and selecting any one of the tones in a plurality of octaves of a musical scale, amplitude control means for changing the amplitude of a selected tone, spectrum controller means for determining the frequency spectrum of a selected tone, selective switching means for connecting said first means, said amplitude control means and said spectrum controller means in cascade in a signal channel, means for maintaining said channel normally blocked to the passage of signal, and means for unblocking said channel after the selection of a tone to cause said tone to appear at the output terminals of said channel as modified by said amplitude control means and by said spectrum controller means.

13. The invention according to claim 12 wherein said unblocking means comprises means for producing a plurality of unblocking pulses having different wave forms and means for selecting one of said unblocking pulses and applying it to unblock said channel as a function of the waveform of said selected unblocking pulse.

14. In combination, means for producing tones of a musical scale, amplitude control means connected in cascade in a signal channel with said first means for determining the amplitude of a selected tone, a coded record, means responsive to said coded record for selecting said tones in rapid succession and for causing each selected tone to appear at the output terminals of said channel with the envelope of at least certain selected tones having a comparatively fast rise time, and means including said amplitude control means for causing at least certain of said selected tones to change in amplitude at a comparatively slow rate while they are appearing at said output terminals in accordance with coding on said record.

15. In combination, means for producing tones of a musical scale, an envelope shaping and keying means, said shaping and keying means comprising a normally blocked circuit and an unblocking circuit, said unblocking circuit including means for producing an unblocking pulse having a comparatively fast rise time, amplitude control means connected in cascade in a signal channel with said first means and said normally blocked circuit for determining the amplitude of a selected tone, a coded record, means responsive to said coded record for selecting said tones in rapid succession and for applying each selected tone to the input terminals of said channel, switching means connected to said unblocking circuit to apply said unblocking pulse to unblock said normally blocked circuit so that the envelope of at least certain selected tones having a comparatively fast rise time, and means including said amplitude control means for causing at least certain of said selected tones to change in amplitude at a comparatively slow rate while they are appearing at said output terminals in accordance with coding on said record.

16. A music synthesizer to be operated by a coded record comprising in combination: a source of a plurality of alternating currents each current having a different frequency to provide tones in an octave of a musical scale, an octaver unit comprising means for supplying octave tones for any of said alternating currents supplied thereto, said source and said octaver being connected in cascade, a selective switching means for supplying a selected alternating current to said octaver, additional selective switching means connected for selecting a desired octave tone from said octaver, and means responsive to a coded playing record for actuating said first selective switching means and for also actuating said additional selective switching means.

17. A music synthesizer to be operated by a coded record comprising in combination: a plurality of alternating current sources, each having a different frequency to provide tones in an octave of a musical scale, an octaver unit comprising means for supplying octave tones for any frequency source supplied thereto, selective switching means, means for connecting said sources and said octaver in cascade through said selective switching means for connecting a selected source to said octaver, additional selective switching means connected for selecting a desired octave tone from said octaver, and means responsive to said coded playing record for actuating said first selective switching means and for also actuating said additional selective switching means.

18. A music synthesizer to be operated by a binary coded record comprising in combination: a source of a plurality of alternating currents each current having a different frequency to provide tones in an octave of a musical scale, an octaver unit comprising means for supplying octave tones for any of said alternating currents supplied thereto, selective switching means comprising a relay tree, said source and said octaver being connected in cascade through said selective switching means for supplying a selected alternating current to said octaver, additional selective switching means connected for selecting a desired octave tone from said octaver, and means responsive to said coded playing record for actuating said first selective switching means and for also actuating said additional selective switching means.

19. A music synthesizer to be operated by a coded record comprising in combination: means for supplying a plurality of signals of different fundamental frequencies to provide tones over a plurality of octaves of a musical scale, an envelope shaper and keyer unit, said unit comprising a normally blocked circuit and an unblocking circuit selective switching means, means for connecting said signal supply means and said shaper and keyer unit in cascade through said selective switching means for supplying a selected signal to said shaper and keyer unit, additional switching means connected to said unblocking circuit to make said unblocking circuit effective to unblock said normally blocked circuit, and means responsive to said coded playing record for actuating said first selective switching means and for also actuating said additional switching means.

20. A music synthesizer to be operated by a coded record comprising in combination: means for supplying a plurality of signals of different fundamental frequencies to provide tones over a plurality of octaves of a musical scale, an envelope shaper and keyer unit, said unit comprising a normally blocked circuit and a plurality of unblocking circuits, selective switching means, means for connecting said signal supply means and said shaper and keyer unit in cascade through said selective switching means for supplying a selected signal to said shaper and keyer unit, additional selective switching means connected to said unblocking circuits to make a selected unblocking circuit effective to unblock said normally blocked circuit, and means responsive to said coded playing record for actuating said first selective switching means and for also actuating said additional selective switching means.

21. A music synthesizer to be operated by a coded record comprising in combination: means for supplying a plurality of signals of different fundamental frequencies to provide tones over a plurality of octaves of a musical scale, an envelope shaper and keyer unit, said unit comprising a normally blocked circuit and a plurality of unblocking circuits, each of said unblocking circuits including means for producing an unblocking pulse of a different waveform than that produced by the other unblocking circuits, selective switching means, means for connecting said signal supply means and said shaper and keyer unit in cascade through said selective switching means for supplying a selected signal to said shaper and keyer unit, additional selective switching means connected to said unblocking circuits to make a selected unblocking circuit effective to unblock said normally blocked circuit, and means responsive to said coded playing record for actuating said first selective switching means and for also actuating said additional selective switching means.

22. A music synthesizer to be operated by a coded record comprising in combination: means for supplying a plurality of signals of different fundamental frequencies to provide tones over a plurality of octaves of a musical scale, an envelope shaper and keyer unit, said unit comprising a normally blocked circuit and an unblocking circuit, selective switching means, means for connecting said signal supply means and said shaper and keyer unit in cascade through said selective switching means for supplying a selected signal to said shaper and keyer unit, additional switching means connected to said unblocking circuit to make said unblocking circuit effective to unblock said normally blocked circuit, and means responsive to said coded playing record for actuating said first selective switching means and for also actuating said additional switching means, a volume control unit, another selective switching means, means for connecting said volume control unit in cascade with said signal supply means and said shaper and keyer unit through said last selective switching means, and means responsive to said coded playing record for actuating said last selective switching means for changing the volume of a tone.

23. A music synthesizer to be operated by a coded record comprising in combination: means for supplying a plurality of signals having different fundamental frequencies to provide tones over a plurality of octaves of a musical scale and also having a complex waveform, an envelope shaper and keyer unit, said unit comprising a normally blocked circuit and an unblocking circuit, selective switching means, means for connecting said signal supply means and said shaper and keyer unit in cascade through said selective switching means for supplying a selected signal to said shaper and keyer unit, additional switching means connected to said unblocking circuit to make said unblocking circuit effective to unblock said normally blocked circuit, means responsive to said coded playing record for actuating said first selective switching means and for also actuating said additional switching means, a unit for controlling the frequency spectrum of a signal, another selective switching means, means for connecting said spectrum controlling unit in cascade with said signal supply means and said shaper and keyer unit through said last selective switching means, and means responsive to said coded playing record for actuating said last selective switching means.

24. A music synthesizer to be operated by a coded record comprising in combination: means for supplying a plurality of signals of different fundamental frequencies to provide tones over a plurality of octaves of a musical scale, control means for changing a characteristic of a tone applied thereto, selective switching means, means for connecting said signal supply means and said control means in cascade through said selective switching means whereby a selected tone may be supplied to said control means, means including additional selective switching means for changing the effect of said control means, and means responsive to said coded record for actuating said first selective switching means and for also actuating said additional selective switching means.

25. The invention according to claim 24, wherein said control means comprises means for changing the volume of a tone applied thereto.

26. The invention according to claim 24, wherein said control means comprises means for changing the frequency spectrum of a tone applied thereto.

27. A music synthesizer to be operated by a coded record comprising in combination: means for supplying a plurality of signals of different fundamental frequencies to provide tones over a plurality of octaves of a musical scale, control means for changing a characteristic of a tone applied thereto, selective switching means, means for connecting said signal supply means and said control means in cascade through said selective switching means whereby a selected tone may be supplied to said control means, means including additional selective switching means for changing the effect of said control means, an envelope shaping and keying means, said shaping and keying means comprising a normally blocked circuit and an unblocking circuit, means for connecting said shaping and keying means in cascade with said signal supply means and said control means, further switching means connected to said unblocking circuit to make said unblocking circuit effective to unblock said normally blocked circuit, and means responsive to said coded record for actuating said first selective switching means, for actuating said additional selective switching means, and for also actuating said further switching means all in accordance with individual coding for said several switching means, respectively.

28. The invention according to claim 27, wherein said control means comprises means for changing the volume of a tone applied thereto.

29. The invention according to claim 27, wherein said control means comprises means for changing the frequency spectrum of a tone applied thereto.

30. A music synthesizer to be operated by a coded record comprising in combination: means for supplying a plurality of signals of different fundamental frequencies to provide tones over a plurality of octaves of a musical scale, control means for changing a characteristic of a tone applied thereto, selective switching means, means for connecting said signal supply means and said control means in cascade through said selective switching means whereby a selected tone may be supplied to said control means, means including additional selective switching means for changing the effect of said control means, envelope shaping and keying means, said shaping and keying means comprising a normally blocked circuit and an unblocking circuit, means for connecting said shaping and keying unit in cascade with said signal supply means and said control means, further switching means connected to said unblocking circuit to make said unblocking circuit effective to unblock said normally blocked circuit, a coded record, and means including said coded record first for actuating said first selective switching means and said additional selective switching means, and for later actuating said further switching means all in accordance with individual coding for said several switching means, respectively.

31. A music synthesizer comprising a coded record, means for synthesizing each individual note of a piece of music in response to the coding on said record, said means comprising at least two signal channels, each of said channels comprising means for supplying tones of a musical scale, and a plurality of means connected in cascade with said tone supplying means for individually controlling in response to said coding a characteristic of a tone passed therethrough, and means for combining the outputs of said channels to supply them to a common output circuit.

32. A music synthesizer to be operated by a coded record comprising in combination at least two signal channels each comprising means for supplying a plurality of signals of different fundamental frequencies to provide tones over a plurality of octaves of a musical scale, control means for changing a characteristic of a tone applied thereto, selective switching means, means for connecting said signal supply means and said control means in cascade through said selective switching means whereby a selected tone may be supplied to said control means, means including additional selective switching means for changing the effect of said control means, and means including said coded record for actuating said first selective switching means and for also actuating said additional selective switching means, and means for combining the outputs of said channels to supply them to a common output circuit.

33. In a music synthesizer to be operated by a coded record, means for producing tones of a musical scale, said synthesizer comprising at least two signal channels, each of said channels including; amplitude control means for changing the amplitude of a selected tone, spectrum controller means for determining the frequency spectrum of a selected tone, selective switching means for selecting any one of said tones, and additional selective switching means for connecting said amplitude control means and said spectrum controller means in cascade in the signal channel; a coded record, means including said record for causing a selected tone to appear at the output terminals of first one of said channels as modified by said amplitude control means and by said spectrum controller means, and for then causing a selected tone to appear at the output terminals of another of said channels as modified by the amplitude control means and the spectrum controller means in said other channel, and means for combining the outputs of said channels to supply them to a common output circuit.

34. A music synthesizer to be operated by a coded record, said synthesizer comprising at least two channels, each of said channels comprising in combination: means for supplying a plurality of signals of different fundamental frequencies to provide tones over a plurality of octaves of a musical scale, control means for changing a characteristic of a tone applied thereto, selective switching means, means for connecting said signal supply means and said control means in cascade through said selective switching means whereby a selected tone may be supplied to said control means, means including additional selective switching means for changing the effect of said control means, envelope shaping and keying means, said last-named means comprising a normally blocked circuit and an unblocking circuit, means for connecting said shaping and keying means in cascade with said signal supply means and said control means, further switching means connected to said unblocking circuit to make said unblocking circuit effective to unblock said normally blocked circuit, and means responsive to said coded control record for actuating said first selective switching means, for actuating said additional selective switching means, for also actuating said further switching means all in accordance with individual coding for said several switching means, respectively, and means for combining the outputs of said channels to supply them to a common output circuit.

35. A music synthesizer to be operated by a coded record, said synthesizer comprising at least two channels, each of said channels comprising in combination: means for supplying a plurality of signals of different fundamental frequencies to provide tones over a plurality of octaves of a musical scale, control means for changing a characteristic of a tone applied thereto, selective switching means, means for connecting said signal supply means and said control means in cascade through said selective switching means whereby a selected tone may be supplied to said control means, means including additional selective switching means for changing the effect of said control means, envelope shaping and keying means, said means comprising a normally blocked circuit and an unblocking circuit, means for connecting said shaping and keying means in cascade with said signal supply means and said control means, further switching means connected to said unblocking circuit to make said unblocking circuit effective to unblock said normally blocked circuit, means for combining the outputs of said channels to supply them to a common output circuit, a coded record, and means including said coded record first for actuating said first selective switching means and said additional selective switching means of one of said channels and for next actuating said further switching means of said one channel, and means including said coded record for next actuating said first selective switching means and said additional selective switching means of another of said channels, and for next actuating said further switching means of said other channel all in accordance with individual coding for said several switching means, respectively.

36. In a music synthesizer channel, an envelope shaping and keying unit comprising a normally blocked signal translating device, means for selectively producing unblocking pulses each having a different initial rate of rise, and means for applying the selected pulse to said translating device to unblock it, said selective producing means comprising a capacitor and means including a plurality of circuits for changing the charge on said capacitor when any one of said circuits is closed, said circuits including different amounts of impedance, and selective switching means for selectively closing said circuits, said switching means comprising a relay tree having a plurality of input terminals and output terminal, said input terminals being numbered consecutively from zero beginning with the input terminal that is connected through to the output terminals when the relays of the relay tree are not actuated, said input terminals consisting of an even numbered group and an odd numbered group, said circuits that include the larger amount of impedance being connected to those input terminals of one of said groups that have the lower number.

37. In a music synthesizer channel, an envelope shaping and keying unit comprising a normally blocked signal translating device, means for selectively producing unblocking pulses each having a different initial rate of rise, and means for applying the selected pulse to said translating device to unblock it, said selective producing means comprising a capacitor and means including a plurality of circuits for discharging said capacitor when any one of said circuits is closed, and selective switching means for selectively closing said circuits, said switching means comprising a relay tree having a plurality of input terminals and an output terminal, said input terminals being consecutively numbered from zero beginning with the input terminal that is connected through to the output terminals when the relays of the relay tree are not actuated, said input terminals consisting of an even numbered group and an odd numbered group, said circuits that when closed produce the unblocking pulse with the slower rise being connected to those input terminals of one of said groups that have the lower number.

38. In a music synthesizer channel, an envelope shaping and keying unit comprising a normally blocked signal translating device, means for selectively producing unblocking pulses each having a different initial rate of rise, and means for applying the selected pulse to said translating device to unblock it, said selective producing means comprising a capacitor and means including a plurality of circuits for changing the charge on said capacitor when any one of said circuits is closed, certain of said circuits including impedance units such as to make said rise comparatively slow, other of said circuits including impedance units such as to make said rise comparatively fast, and selective switching means for selectively closing said circuits, said switching means comprising a relay tree having a plurality of input terminals and an output terminal, said input terminals being numbered consecutively from zero beginning with the input terminal that is connected through to the output terminals when the relays of the relay tree are not actuated, said input terminals consisting of an even numbered group and an odd numbered group, said certain circuits being connected to the input terminals of one of said groups and said other circuits being connected to the input terminals of the other of said groups.

39. In a music synthesizer channel, a signal translating circuit that is normally blocked, and means for producing unblocking pulses and applying said pulses to said translating circuit to unblock it, said pulse producing means comprising a capacitor, means for charging said capacitor, at least one discharge circuit for said capacitor including switching means for closing said discharge circuit to produe an unblocking pulse, means including a unilateral conducting device connected across said capacitor in one direction for limiting the current charge of said capacitor in one direction, and a second unilateral conducting device connected across said capacitor in the opposite direction for limiting the current charge of said capacitor in the opposite direction.

40. The invention according to claim 39 wherein said translating circuit comprises an amplifier tube having substantially a logarithmic input-output characteristic, and wherein both of said means for limiting the capacitor charge are adjusted to limit said charge while the charging and discharging of said capacitor are still substantially linear with respect to time.

41. In a music synthesizer channel to be operated by a coded record, a volume control unit comprising an amplifier tube normally biased to plate current cut-off, a bias control circuit through which unblocking pulses may be applied to said amplifier tube, volume control selective switching means for applying unblocking pulses of selected amplitudes to said amplifier tube, filter means in said bias control circuit for determining the rate of rise of an applied unblocking pulse, and selective switching means for changing the time constant of said filter means, and means responsive to said coded record for actuating both of said selective switching means in accordance with individual coding for each switching means.

42. In a music synthesizer channel, a random noise source, octaver means for producing signals in octaves of the frequency of an applied signal, and means for applying the noise from said source to said octaver means whereby there is substantially random operation thereof.

43. The invention according to claim 42, wherein said octaver means includes means for producing a sawtooth wave output.

44. The invention according to claim 43, wherein said channel includes means for accentuating a portion of the frequency spectrum of said octaver means output.

45. In a music synthesizer channel, a random noise source, a chain of frequency dividers, and means for applying the noise from said source to said chain of dividers whereby there is substantially random operation thereof.

46. In a music synthesizer channel, a source of mixed tones that are related to each other by irrational numbers, octaver means for producing signals in octaves of the frequency of an applied signal, and means for applying said mixed tones to said octaver means whereby there is substantially random operation thereof.

47. In a music synthesizer channel, a source of mixed tones that are related to each other by irrational numbers, a frequency divider, and means for applying said mixed tones to said divider whereby there is substantially random operation thereof.

48. In combination, means for producing tones of a musical scale, control means connected in cascade in a signal channel with said first means for changing a characteristic of a selected tone, a source of coded signals, means responsive to signals from said source for selecting said tones in succession and for causing each selected tone to appear at the output terminals of said channel, and means including said control means for causing at least certain of said selected tones to change in said characteristic in accordance with coded signals from said source of coded signals while they are appearing at said output terminals.

49. In combination, means for producing tones of a musical scale, control means connected in cascade in a signal channel with said first means for changing a characteristic of a selected tone, a source of combinatory code signals, means responsive to signals from said source for selecting said tones in succession and for causing each selected tone to appear at the output terminals of said channel, and means including said control means for causing at least certain of said selected tones to change in said characteristic in accordance with coded signals from said source of coded signals while they are appearing at said output terminals.

50. In combination, means for producing tones of a musical scale, control means connected in cascade in a signal channel with said first means for changing a characteristic of a selected tone, a source of binary code signals, means responsive to signals from said source for selecting said tones in succession and for causing each selected tone to appear at the output terminals of said channel, and means including said control means for causing at least certain of said selected tones to change in said characteristic in accordance with coded signals from said source of coded signals while they are appearing at said output terminals.

References Cited in the file of this patent

UNITED STATES PATENTS

| | | |
|---|---|---|
| 1,376,288 | Miller | Apr. 26, 1921 |
| 1,819,820 | Kent | Aug. 18, 1931 |

(Other references on following page)

UNITED STATES PATENTS

| | | |
|---|---|---|
| 1,957,392 | Coupleux et al. | May 1, 1934 |
| 2,043,707 | Nelson | June 9, 1936 |
| 2,121,142 | Dudley | June 21, 1938 |
| 2,301,871 | Hanert | Nov. 10, 1942 |
| 2,304,856 | Snow | Dec. 15, 1942 |
| 2,403,090 | Larsen | July 2, 1946 |
| 2,403,664 | Langer | July 9, 1946 |
| 2,432,152 | Hanert et al. | Dec. 9, 1947 |
| 2,441,387 | Berger et al. | May 11, 1948 |
| 2,498,337 | Kent | Feb. 21, 1950 |
| 2,526,003 | Confora | Oct. 17, 1950 |
| 2,541,051 | Hanert | Feb. 13, 1951 |
| 2,545,469 | Jordan | Mar. 20, 1951 |
| 2,545,665 | Larsen | Mar. 20, 1951 |
| 2,547,251 | Bonadio | Apr. 3, 1951 |
| 2,556,935 | Mulligan et al. | June 12, 1951 |
| 2,557,085 | Fisk et al. | June 19, 1951 |
| 2,557,086 | Fisk et al. | June 19, 1951 |
| 2,562,908 | Hanert | Aug. 7, 1951 |
| 2,563,299 | Acosta | Aug. 7, 1951 |
| 2,577,753 | Hanert | Dec. 11, 1951 |
| 2,580,424 | Hanert | Jan. 1, 1952 |
| 2,590,110 | Lippel | Mar. 25, 1952 |
| 2,639,639 | Schmidt | May 26, 1953 |

FOREIGN PATENTS

| | | |
|---|---|---|
| 947,891 | France | Jan. 17, 1949 |